(12) United States Patent
Ito

(10) Patent No.: US 9,866,758 B2
(45) Date of Patent: *Jan. 9, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 14/541,026

(22) Filed: Nov. 13, 2014

(65) Prior Publication Data

US 2015/0138400 A1 May 21, 2015

(30) Foreign Application Priority Data

Nov. 18, 2013 (JP) ................................. 2013-238317

(51) Int. Cl.
| | |
|---|---|
| *G02B 15/14* | (2006.01) |
| *H04N 5/232* | (2006.01) |
| *G02B 15/173* | (2006.01) |
| *G02B 15/22* | (2006.01) |
| *G02B 15/15* | (2006.01) |
| *G02B 15/16* | (2006.01) |
| *G02B 13/00* | (2006.01) |
| *G02B 15/167* | (2006.01) |
| *G02B 15/20* | (2006.01) |

(52) U.S. Cl.
CPC ....... *H04N 5/23296* (2013.01); *G02B 15/173* (2013.01); *G02B 15/22* (2013.01); *G02B 13/009* (2013.01); *G02B 15/14* (2013.01); *G02B 15/15* (2013.01); *G02B 15/16* (2013.01); *G02B 15/167* (2013.01); *G02B 15/20* (2013.01)

(58) Field of Classification Search
CPC ...... G02B 15/173; G02B 15/22; G02B 15/00; G02B 15/14; G02B 15/15; G02B 15/16; G02B 15/167; G02B 15/20; G02B 13/009; H04N 5/23296
USPC .................................. 359/676–679, 683–687
See application file for complete search history.

(56) References Cited

U.S. PATENT DOCUMENTS

2015/0146045 A1* 5/2015 Ito ...................... H04N 5/23296
348/240.3

FOREIGN PATENT DOCUMENTS

JP         2010-256845 A     11/2010

* cited by examiner

*Primary Examiner* — Evelyn A Lester
(74) *Attorney, Agent, or Firm* — Canon USA Inc., IP Division

(57) ABSTRACT

A zoom lens includes, in order from an object side to an image side, a first lens unit having positive refractive power, a second lens unit having negative refractive power, a third lens unit having positive refractive power, and a rear lens group including one or more lens units. The distance between adjacent lens units changes during zooming. The first lens unit is closer to the object side at a telephoto end than at the wide-angle end. The second lens unit includes a first negative lens, a second negative lens, and a third negative lens in this order from the object side. The focal lengths of the zoom lens at the wide-angle end and at the telephoto end, the focal length of the first lens unit, and the focal length of the second lens unit are appropriately set based on predetermined mathematical conditions.

16 Claims, 29 Drawing Sheets

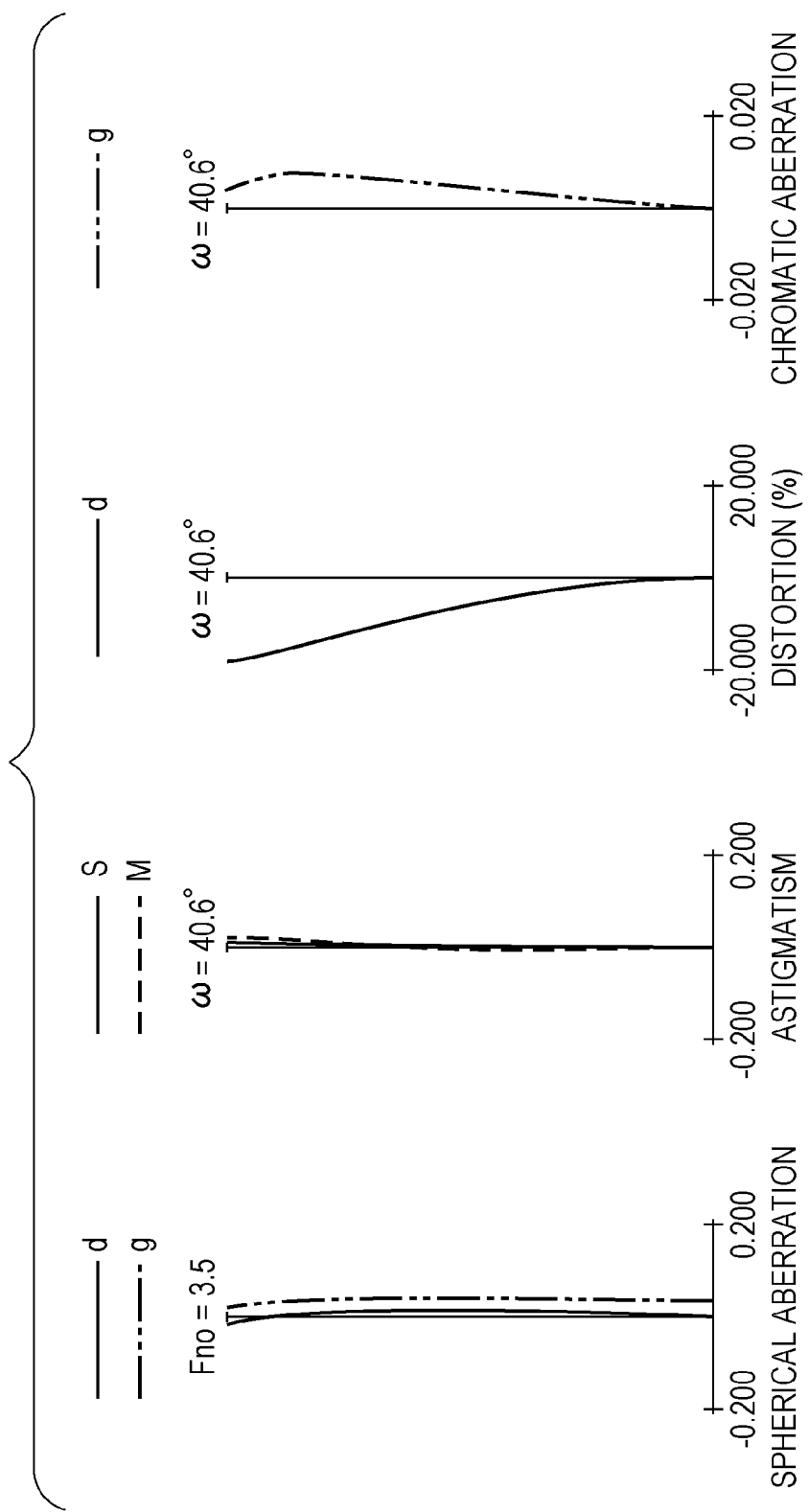

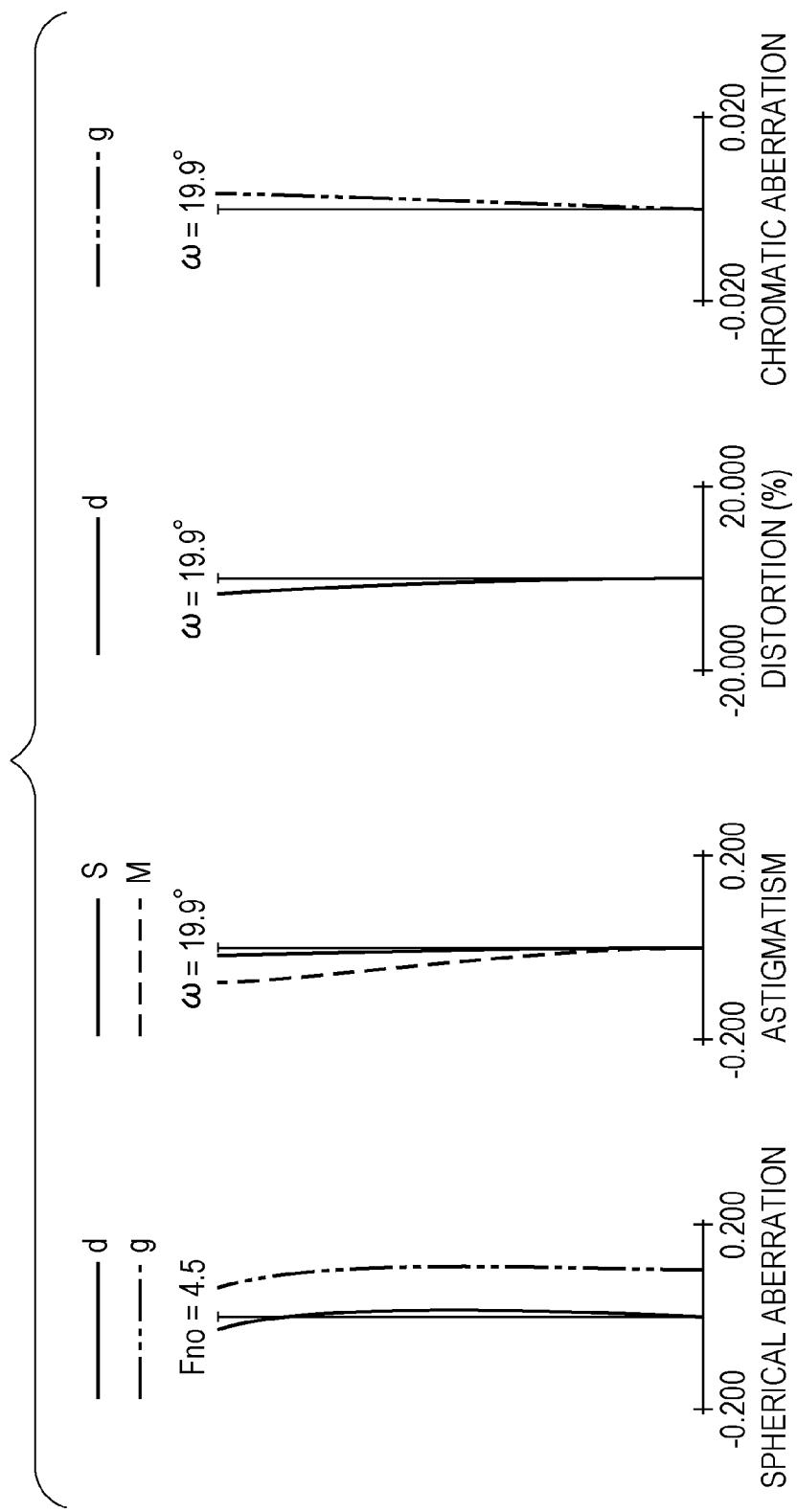

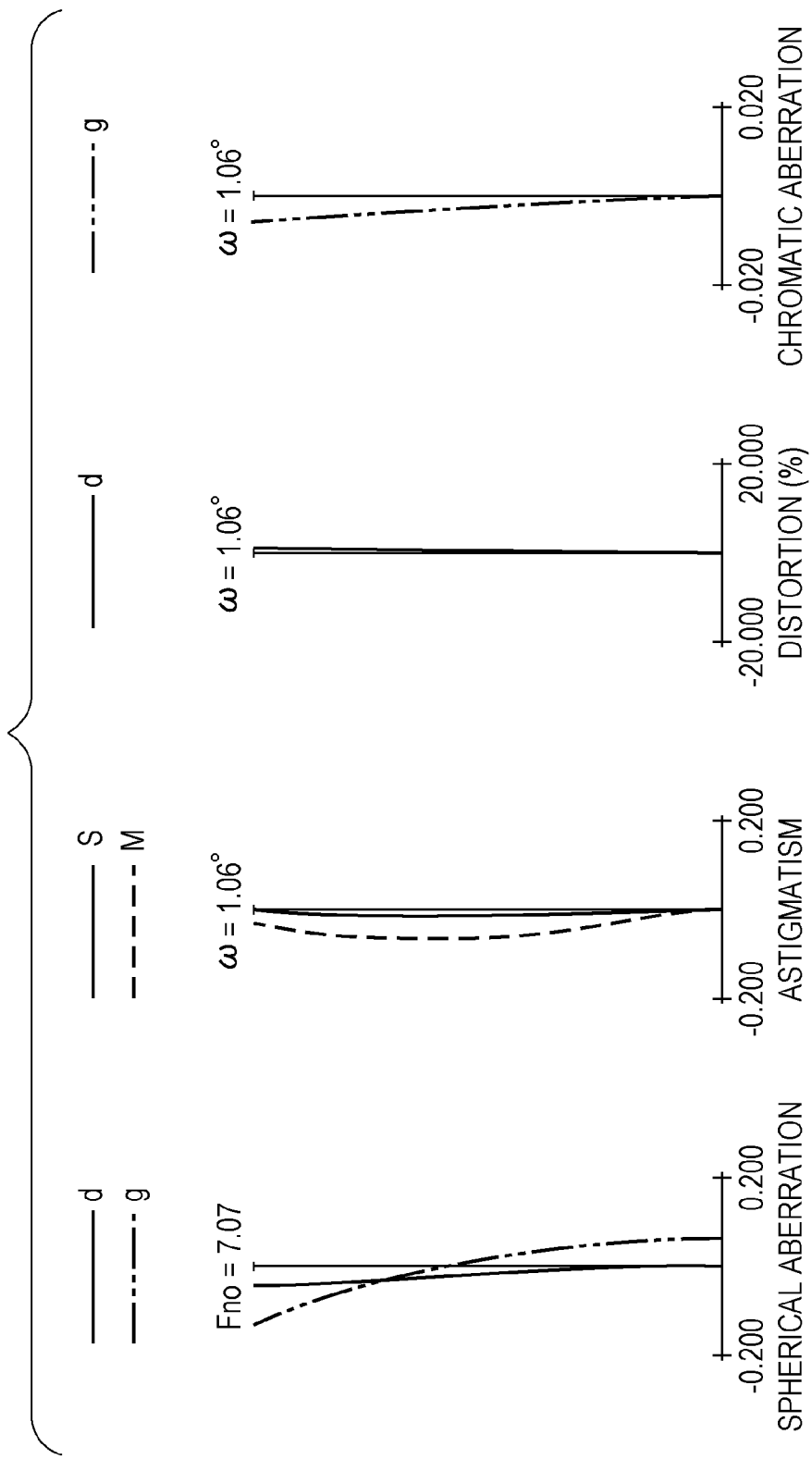

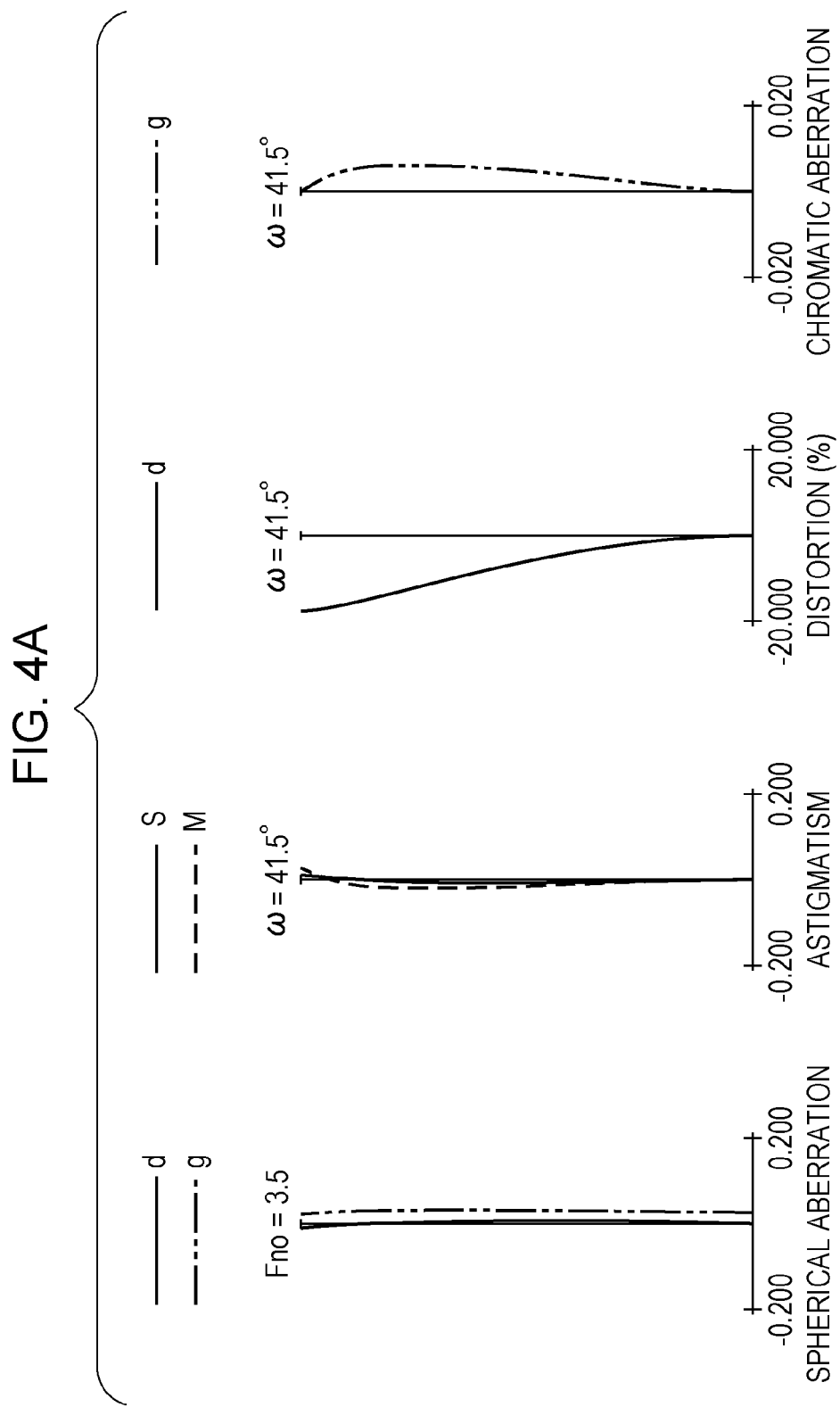

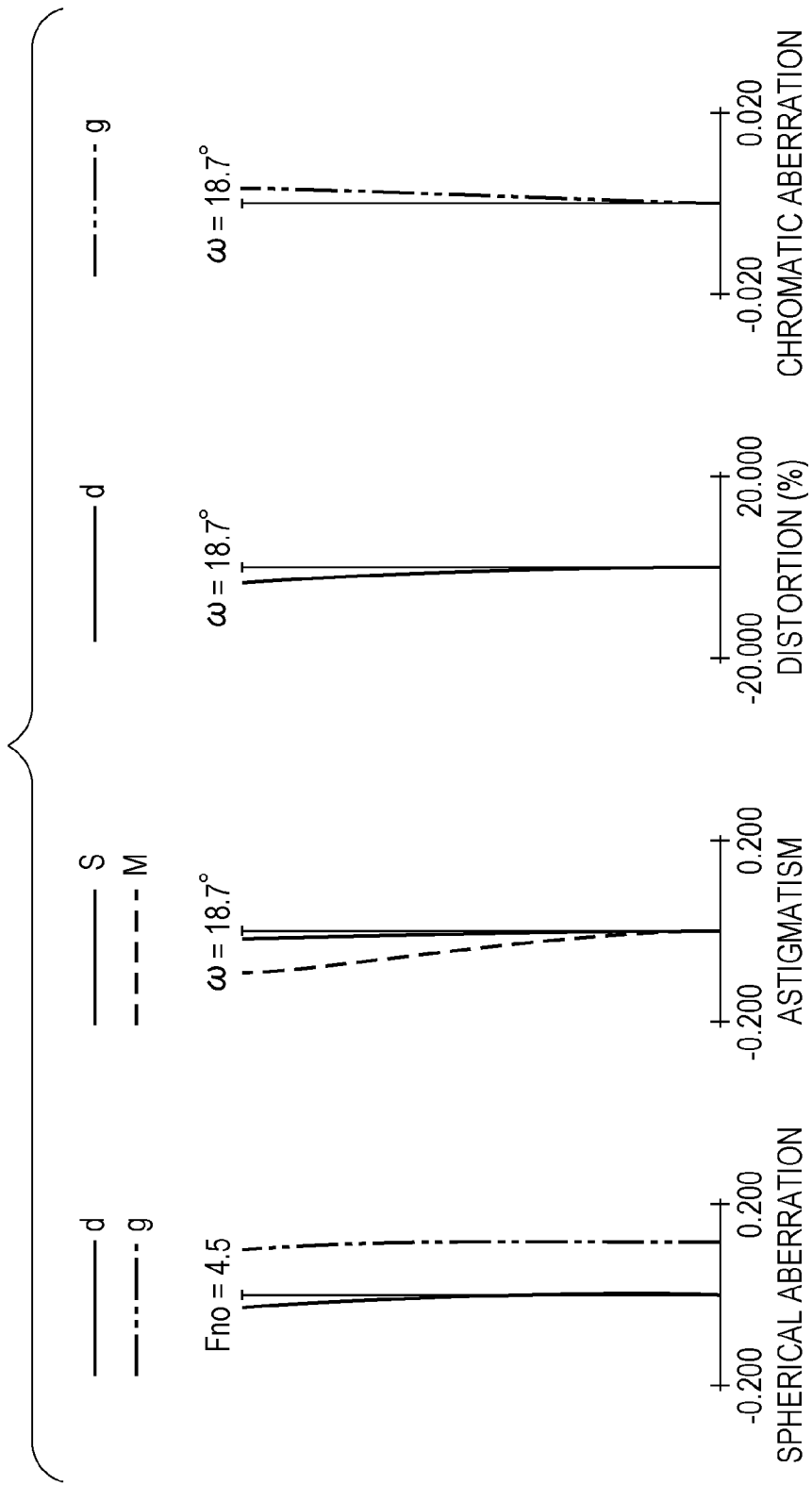

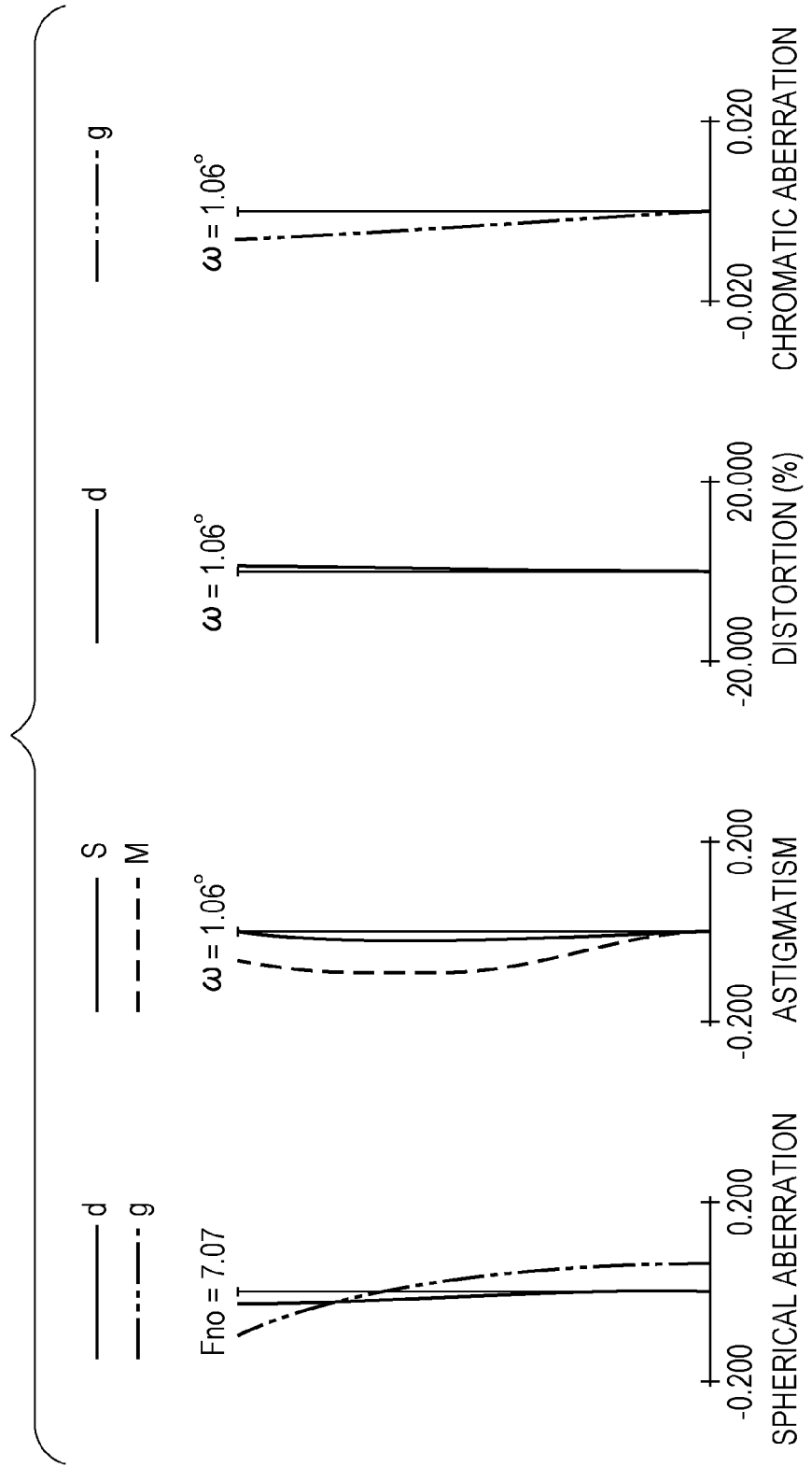

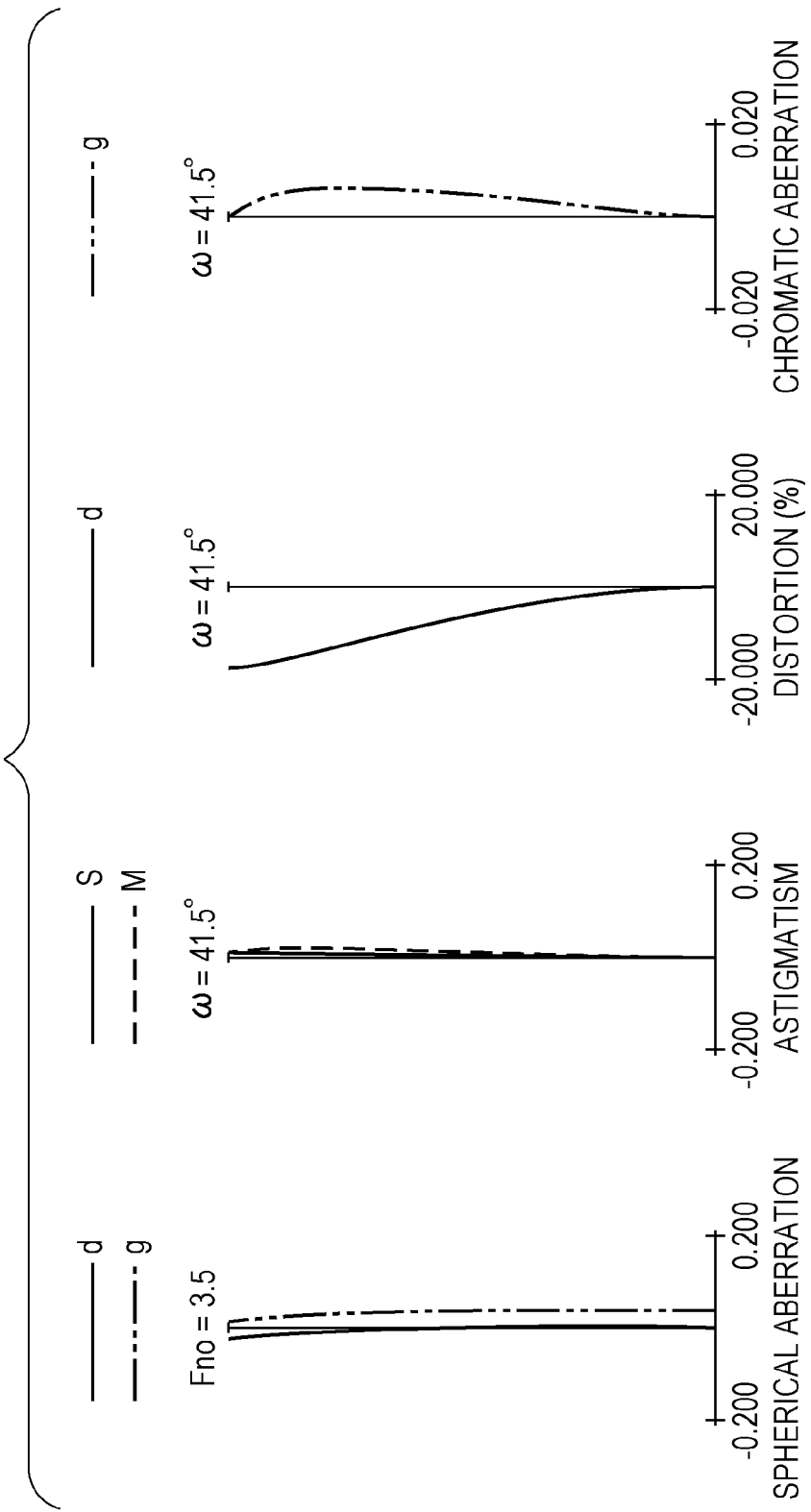

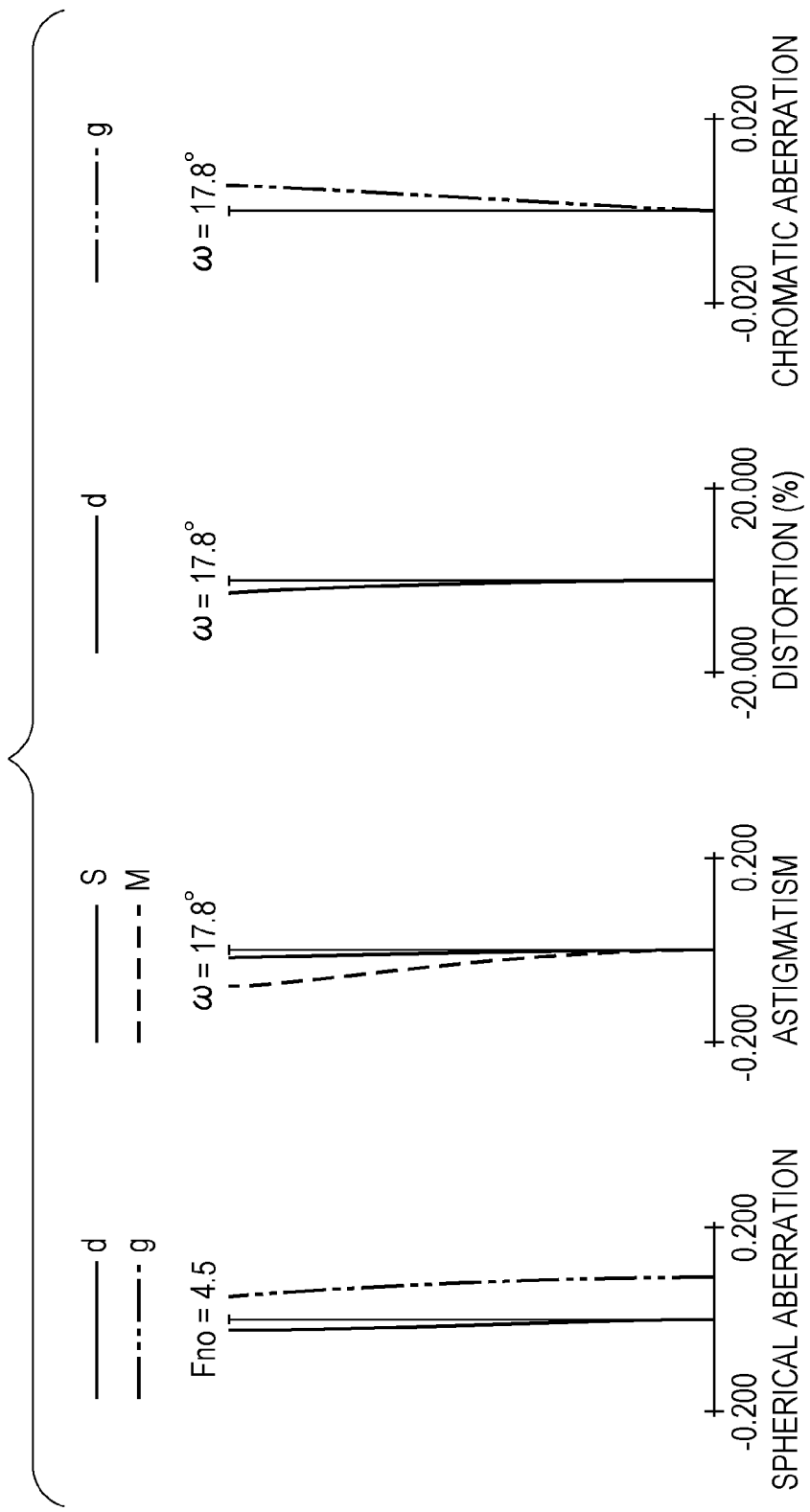

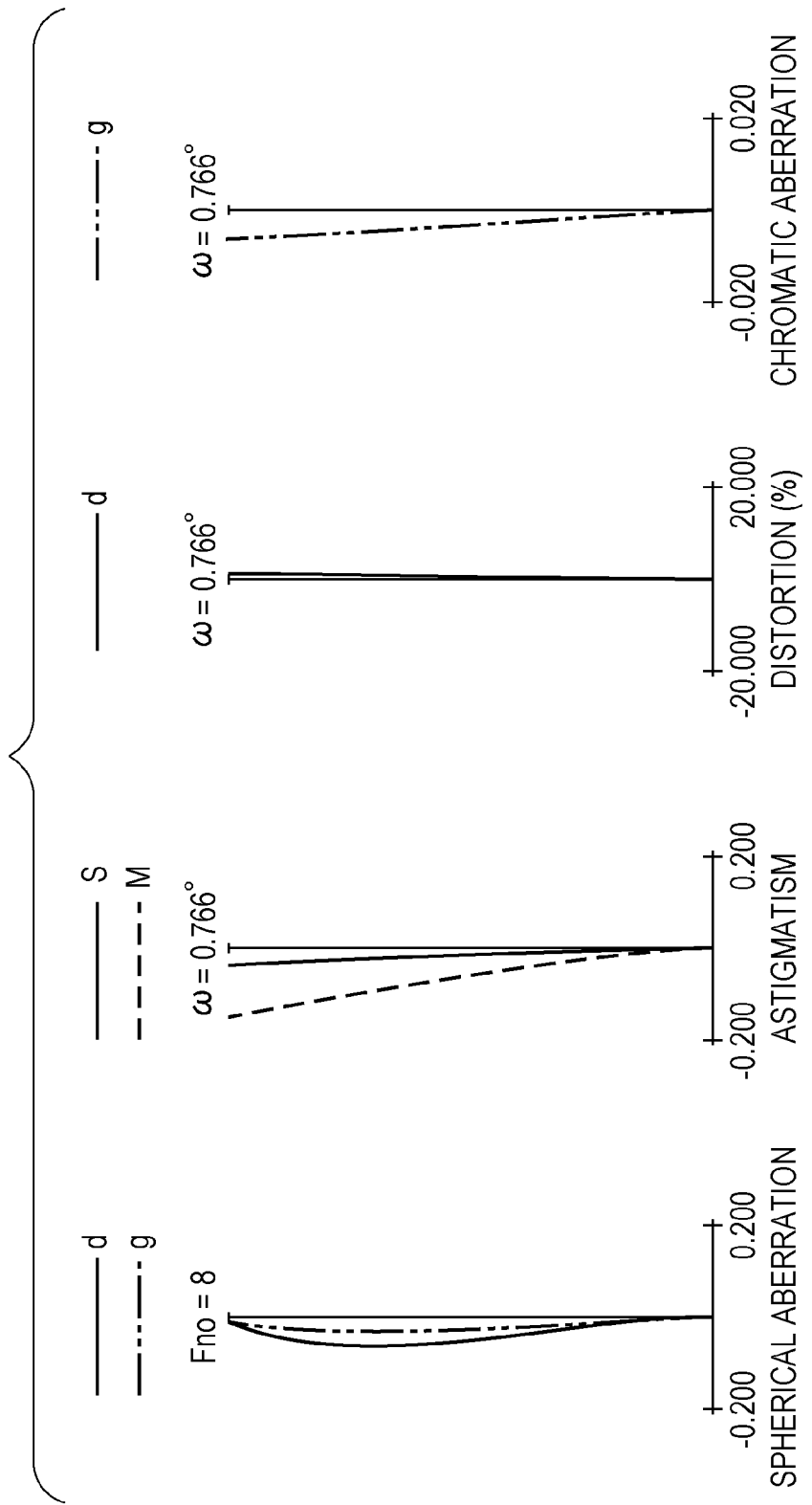

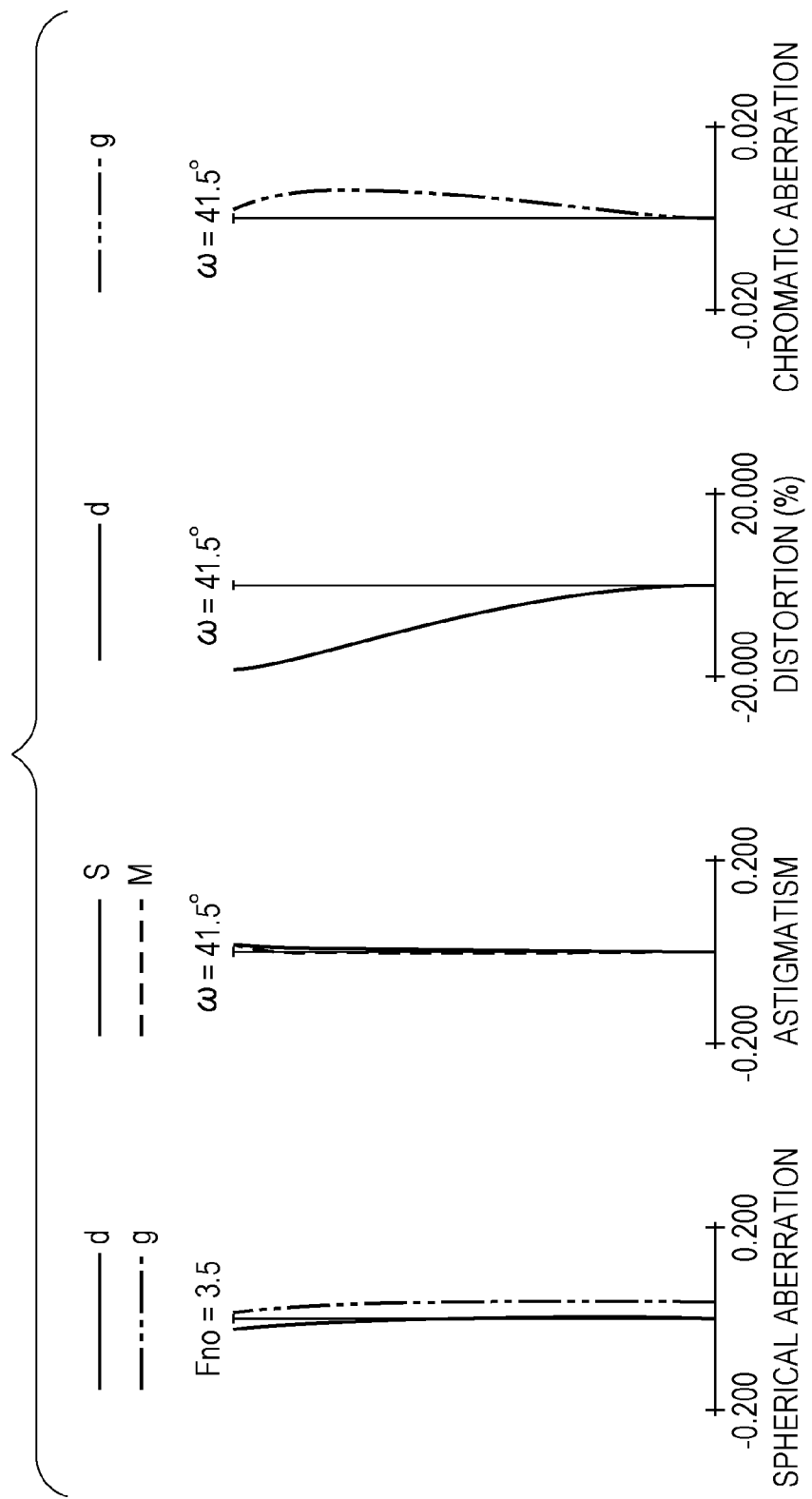

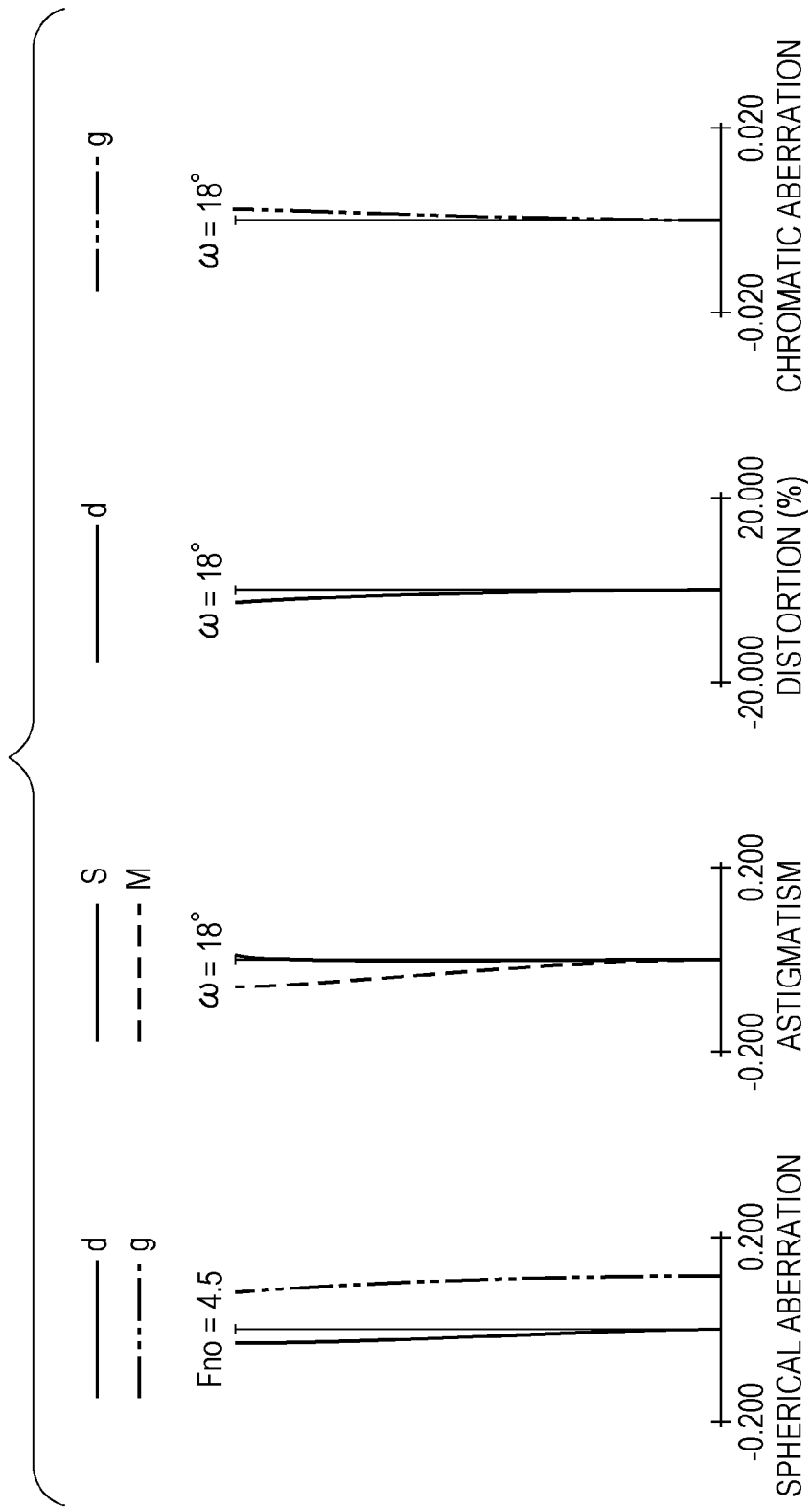

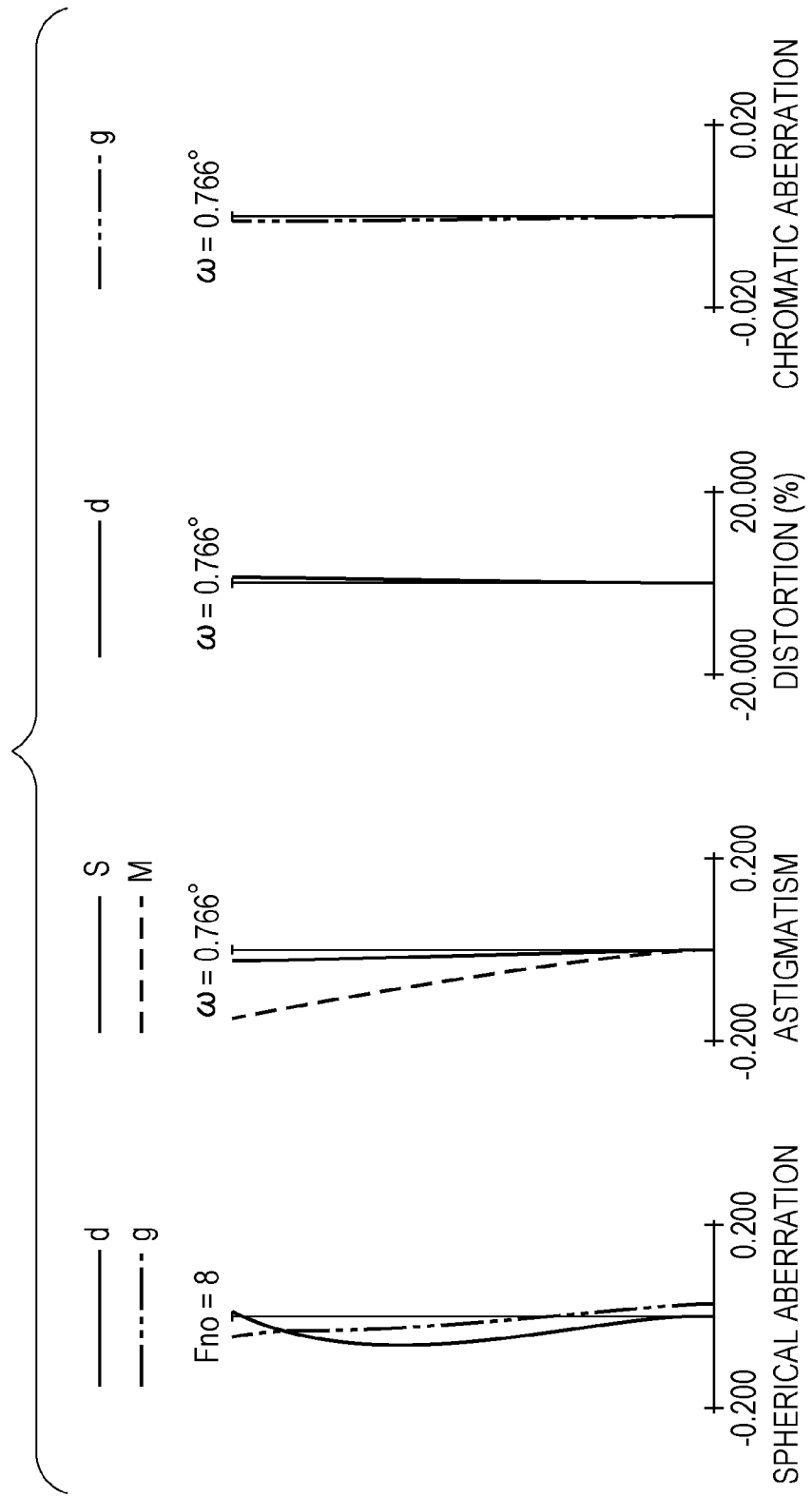

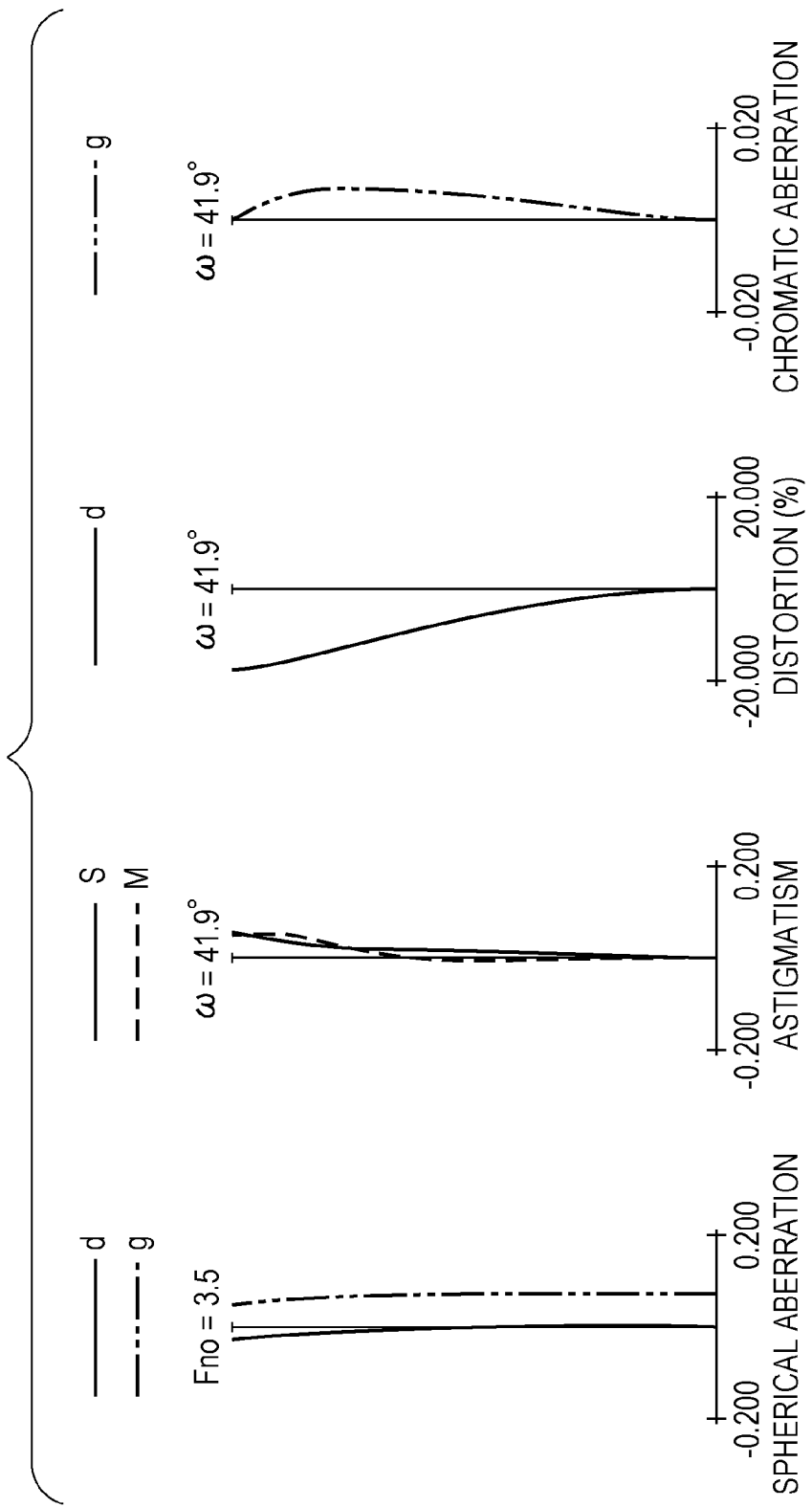

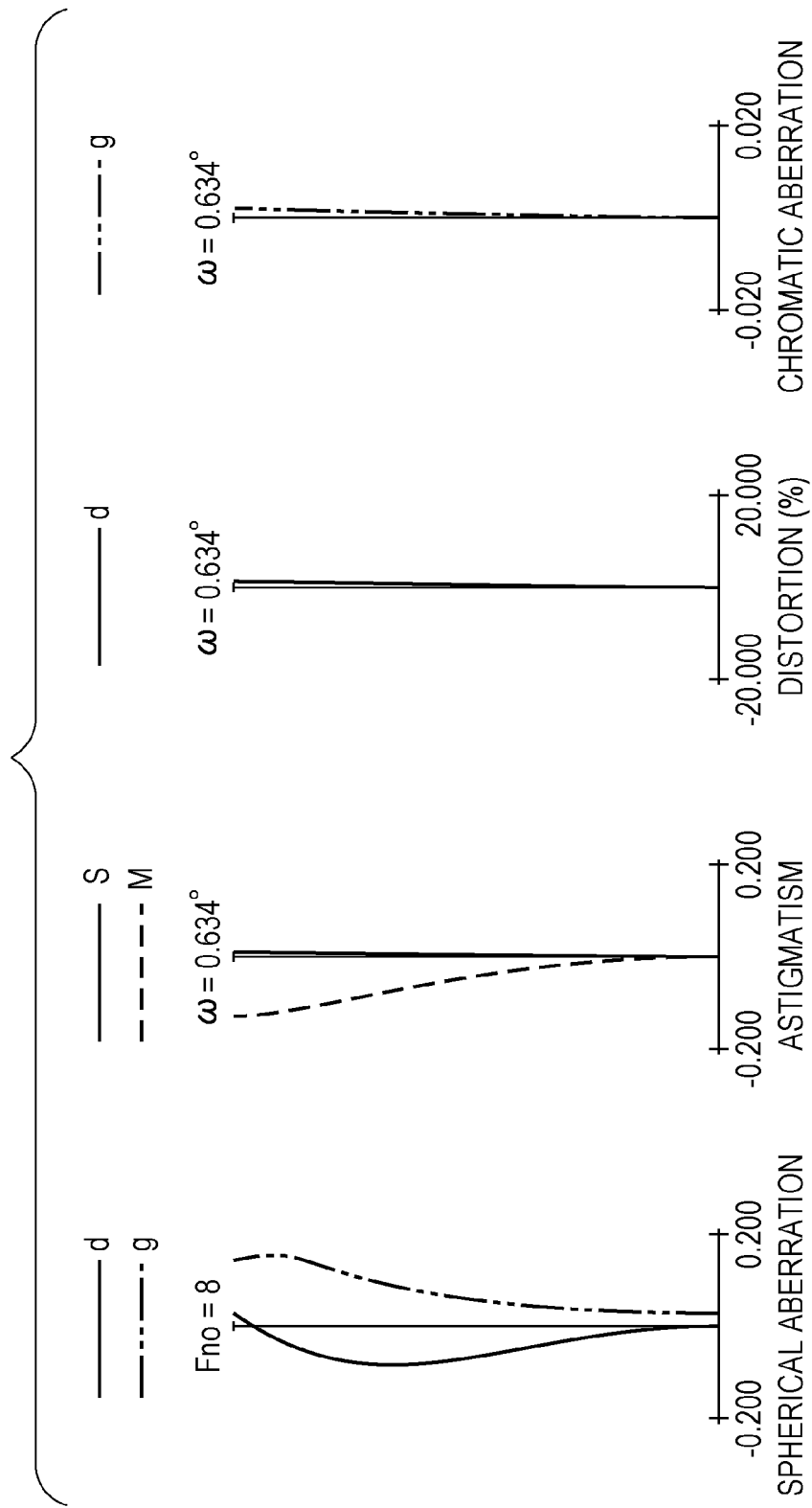

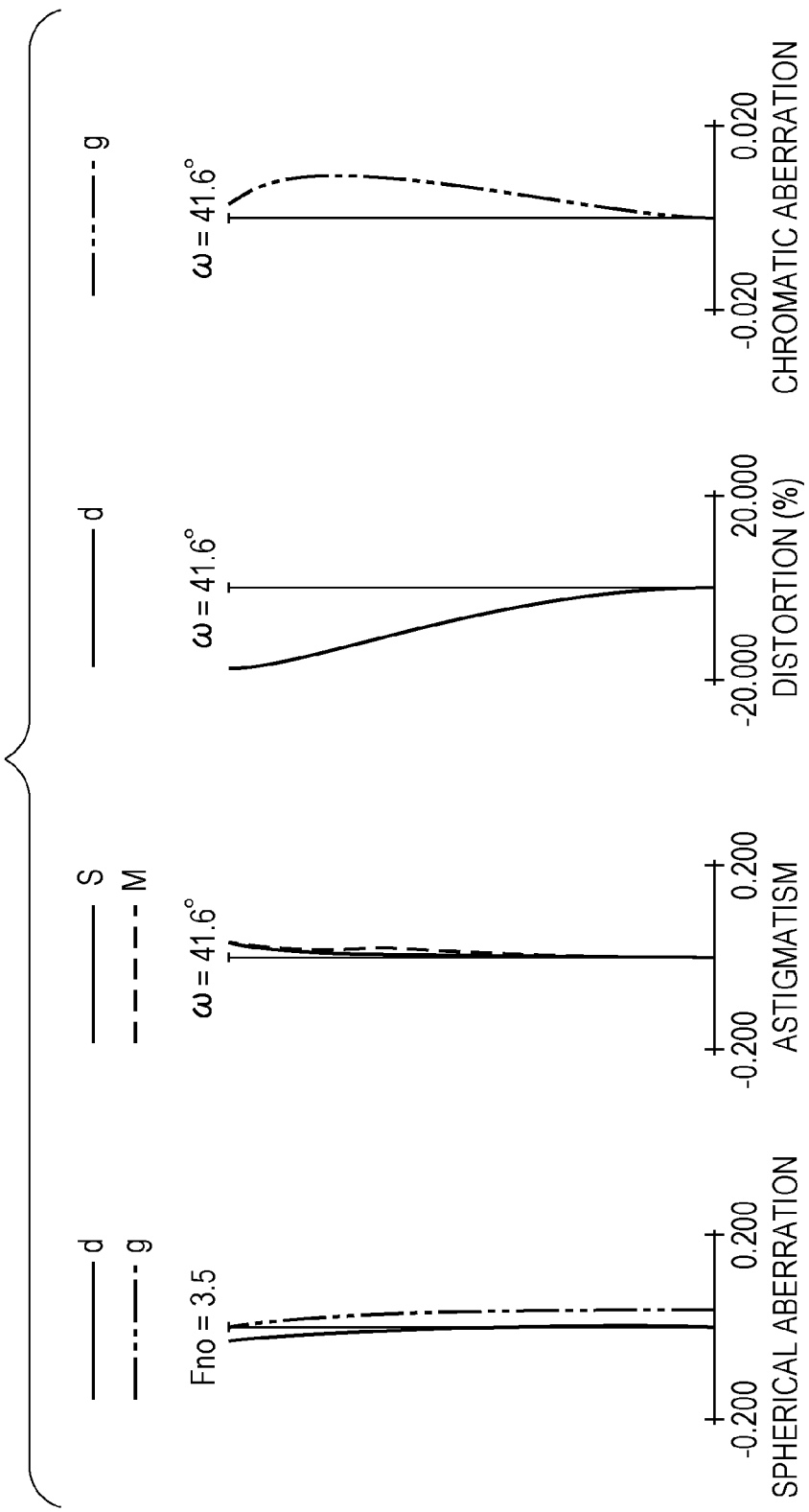

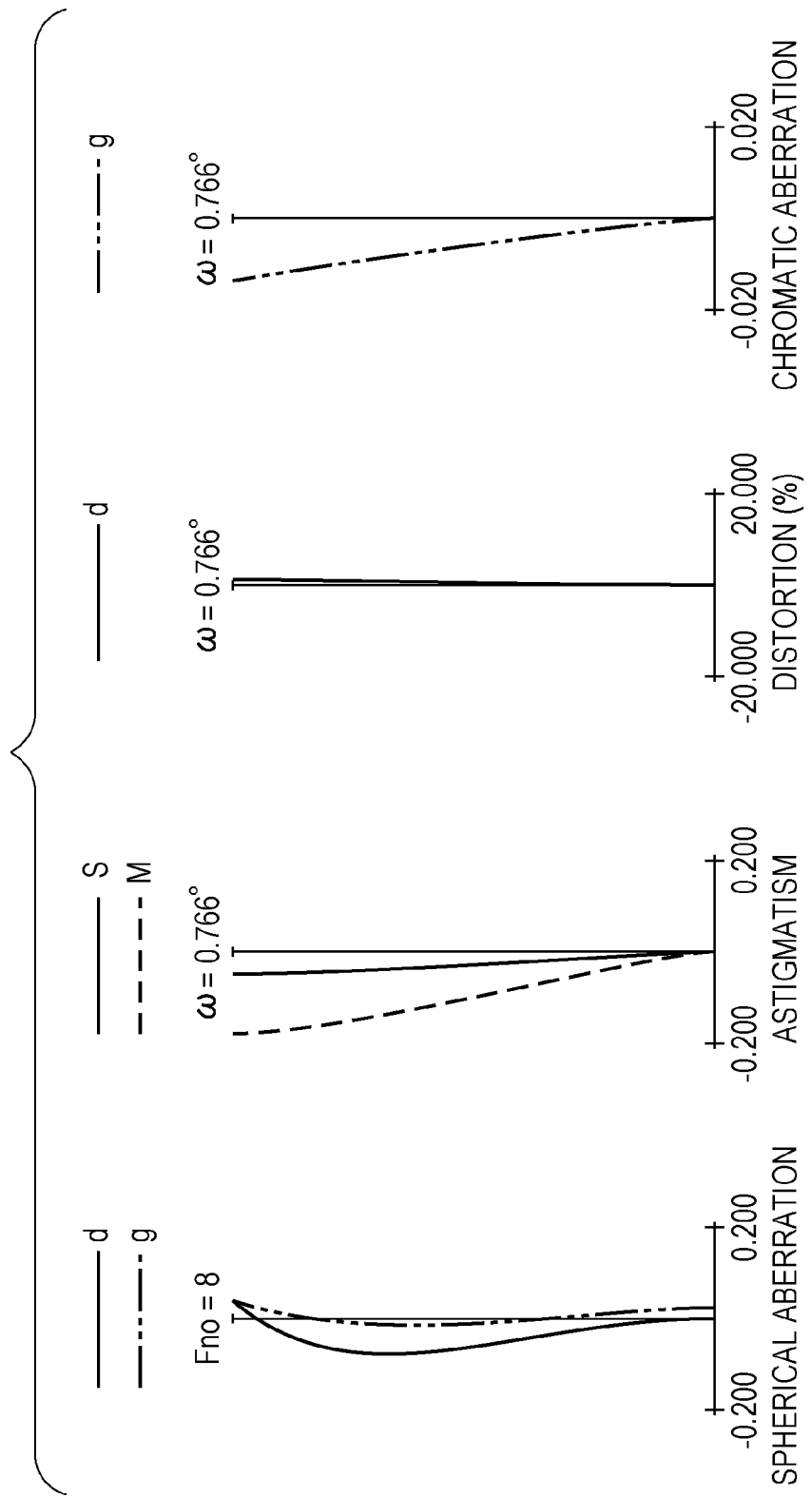

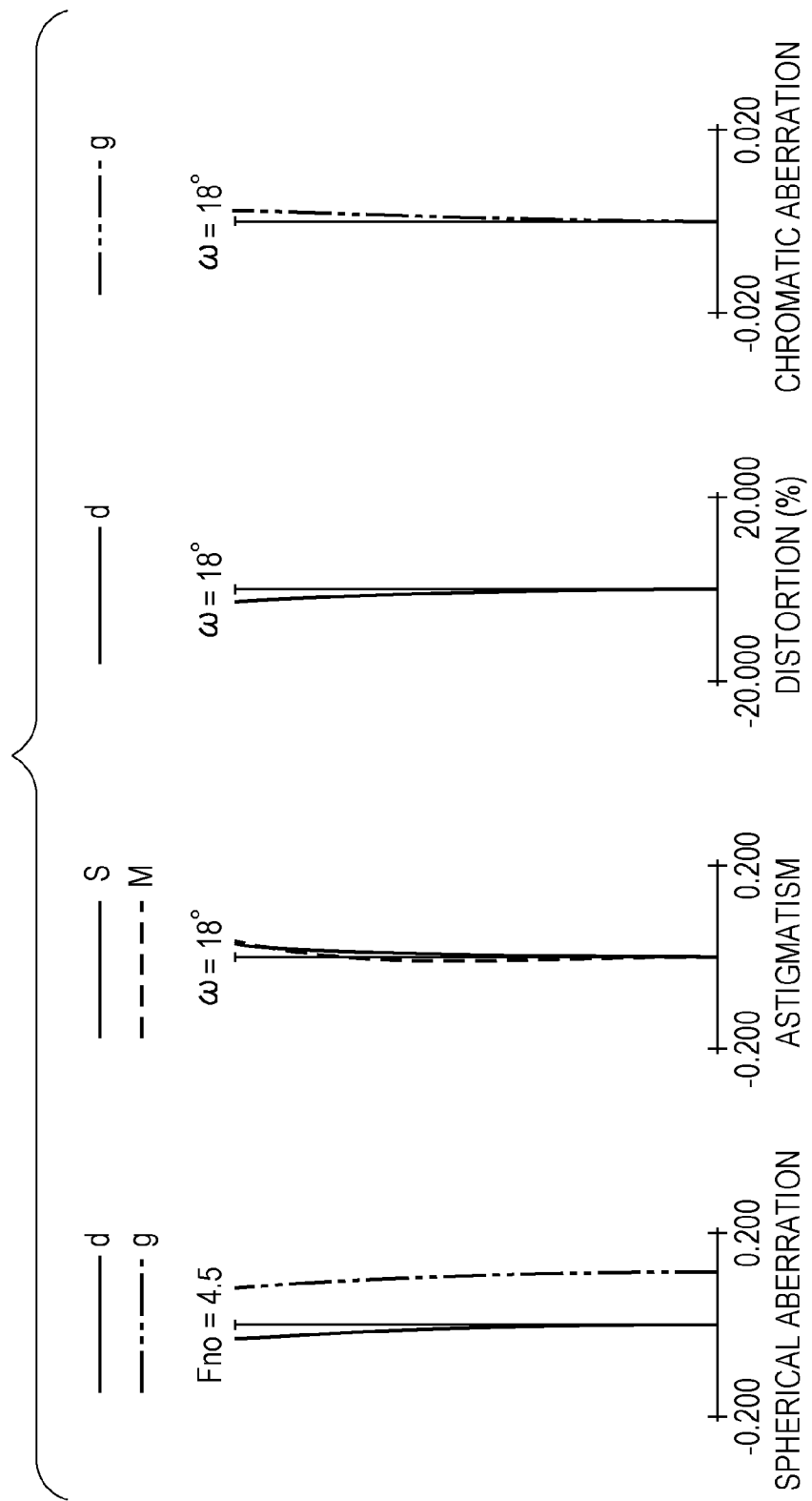

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same. The present invention is suitable for image pickup apparatuses that use an image sensor, such as a digital still camera, a video camera, a monitoring camera, or a broadcasting camera, and image pickup apparatuses, such as a camera that uses silver-halide film.

Description of the Related Art

Image pickup apparatuses, such as a digital still camera and a video camera, that use a solid-state image sensor have recently increased in performance and decreased in size. To that end, zoom lenses for use in such apparatuses are required to have a high magnification ratio, a wide angle of view, be compact, and have a high optical performance in all zoom ranges. As a zoom lens that meets such requirements, a four-unit zoom lens is known which consists of lens units having positive, negative, positive, and positive refractive power in this order from an object side to an image side.

A zoom lens disclosed in Japanese Patent Laid-Open No. 2010-256845 consists of lens units having positive, negative, positive, and positive refractive power in this order from the object side to the image side, of which a second lens unit consists of three negative lenses and one positive lens in order from the object side to the image side. Disposing the three negative lenses in the second lens unit to reduce the proportion of sharing the magnification varying operation of the individual negative lenses allows the Petzval sum to be reduced. Furthermore, disposing the three negative lens at the object side allows the principal point of the second lens unit to be close to the image side, thus reducing the distance between the principal point of a first lens unit and the principal point of the second lens unit.

In general, to obtain a compact, high-magnification image-pickup optical system, the number of lenses that constitute individual lens units is reduced while the refractive power of the individual lens units constituting the image-pickup optical system is increased. However, increasing the refractive power of the lens units increases the refractive power of the surfaces of the lenses constituting the individual lens units, resulting in an increase in the thicknesses of the lenses to ensure sufficient edge thicknesses of the lenses. This increases a front lens diameter (the effective diameter of a front lens), thus making it difficult to obtain a compact optical system. Furthermore, this causes various aberrations, such as chromatic aberration at a telephoto end, which are difficult to correct.

SUMMARY OF THE INVENTION

According to various embodiments of the present invention, a zoom lens includes in order from an object side to an image side: a first lens unit having positive refractive power; a second lens unit having negative refractive power; a third lens unit having positive refractive power; and a rear lens group including one or more lens units. A distance between adjacent lens units changes during zooming. The first lens unit is closer to the object side at a telephoto end than at the wide-angle end. The second lens unit includes a first negative lens, a second negative lens, and a third negative lens in this order from the object side to the image side. The following conditions are satisfied:

$$22.0 < f1/fW < 35.0$$

$$20.0 < |fT/f2| < 50.0$$

where fW is the focal length of the zoom lens at the wide-angle end, fT is the focal length of the zoom lens at the telephoto end, f1 is the focal length of the first lens unit, and f2 is the focal length of the second lens unit.

Further features of the present invention will become apparent from the following description of exemplary embodiments with reference to the attached drawings.

BRIEF DESCRIPTION OF THE DRAWINGS

FIG. 2A is an aberration diagram of the zoom lens at the wide-angle end according to the first embodiment.

FIG. 2B is an aberration diagram of the zoom lens at an intermediate zooming position according to the first embodiment.

FIG. 2C is an aberration diagram of the zoom lens at a telephoto end according to the first embodiment.

FIG. 4A is an aberration diagram of the zoom lens at the wide-angle end according to the second embodiment.

FIG. 4B is an aberration diagram of the zoom lens at the intermediate zooming position according to the second embodiment.

FIG. 4C is an aberration diagram of the zoom lens at the telephoto end according to the second embodiment.

FIG. 6A is an aberration diagram of the zoom lens at the wide-angle end according to the third embodiment.

FIG. 6B is an aberration diagram of the zoom lens at the intermediate zooming position according to the third embodiment.

FIG. 6C is an aberration diagram of the zoom lens at the telephoto end according to the third embodiment.

FIG. 8A is an aberration diagram of the zoom lens at the wide-angle end according to the fourth embodiment.

FIG. 8B is an aberration diagram of the zoom lens at the intermediate zooming position according to the fourth embodiment.

FIG. 8C is an aberration diagram of the zoom lens at the telephoto end according to the fourth embodiment.

FIG. 10A is an aberration diagram of the zoom lens at the wide-angle end according to the fifth embodiment.

FIG. 10C is an aberration diagram of the zoom lens at the telephoto end according to the fifth embodiment.

FIG. 12A is an aberration diagram of the zoom lens at the wide-angle end according to the sixth embodiment.

FIG. 12C is an aberration diagram of the zoom lens at the telephoto end according to the sixth embodiment.

FIG. 14B is an aberration diagram of the zoom lens at the intermediate zooming position according to the seventh embodiment.

DESCRIPTION OF THE EMBODIMENTS

Zoom lenses and image pickup apparatuses including the same in some embodiments of the present invention will now be described in detail with reference to the drawings. A zoom lens in some embodiments of the present invention comprises, in order from an object side to an image side, a first lens unit having positive refractive power, a second lens unit having negative refractive power, a third lens unit having positive refractive power, and a rear lens group having one or more lens units.

Figure 1:
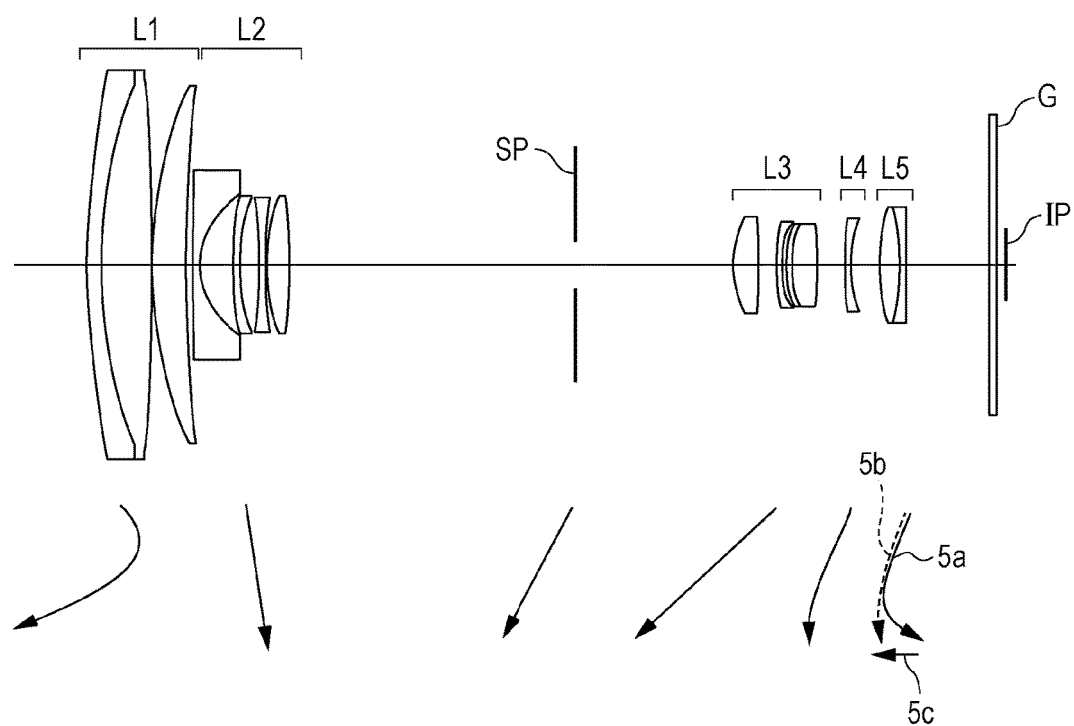
FIG. 1 is a cross-sectional view of a zoom lens at a wide-angle end according to a first embodiment of the present invention.
Figure 3:
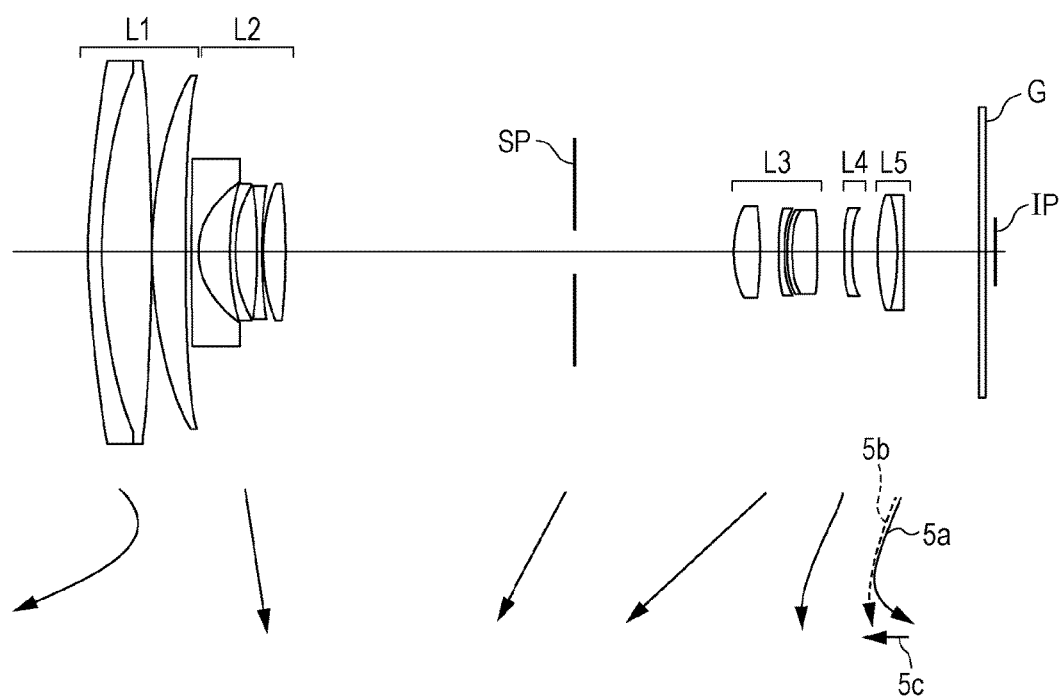
FIG. 3 is a cross-sectional view of a zoom lens at a wide-angle end according to a second embodiment.

FIG. 1 is a cross-sectional view of a zoom lens according to a first embodiment of the present invention at a wide-angle end. FIGS. 2A, 2B, and 2C are aberration diagrams of the zoom lens of the first embodiment at the wide-angle end, an intermediate zooming position, and the telephoto end, respectively. The first embodiment is a zoom lens having a zoom ratio of 56.62 and an aperture ratio of about 3.50 to 7.07. FIG. 3 is a cross-sectional view of a zoom lens according to a second embodiment at the wide-angle end. FIGS. 4A, 4B, and 4C are aberration diagrams of the zoom lens of the second embodiment at the wide-angle end, the intermediate zooming position, and the telephoto end, respectively. The second embodiment is a zoom lens having a zoom ratio of 59.97 and an aperture ratio of about 3.50 to 7.07.

Figure 5:
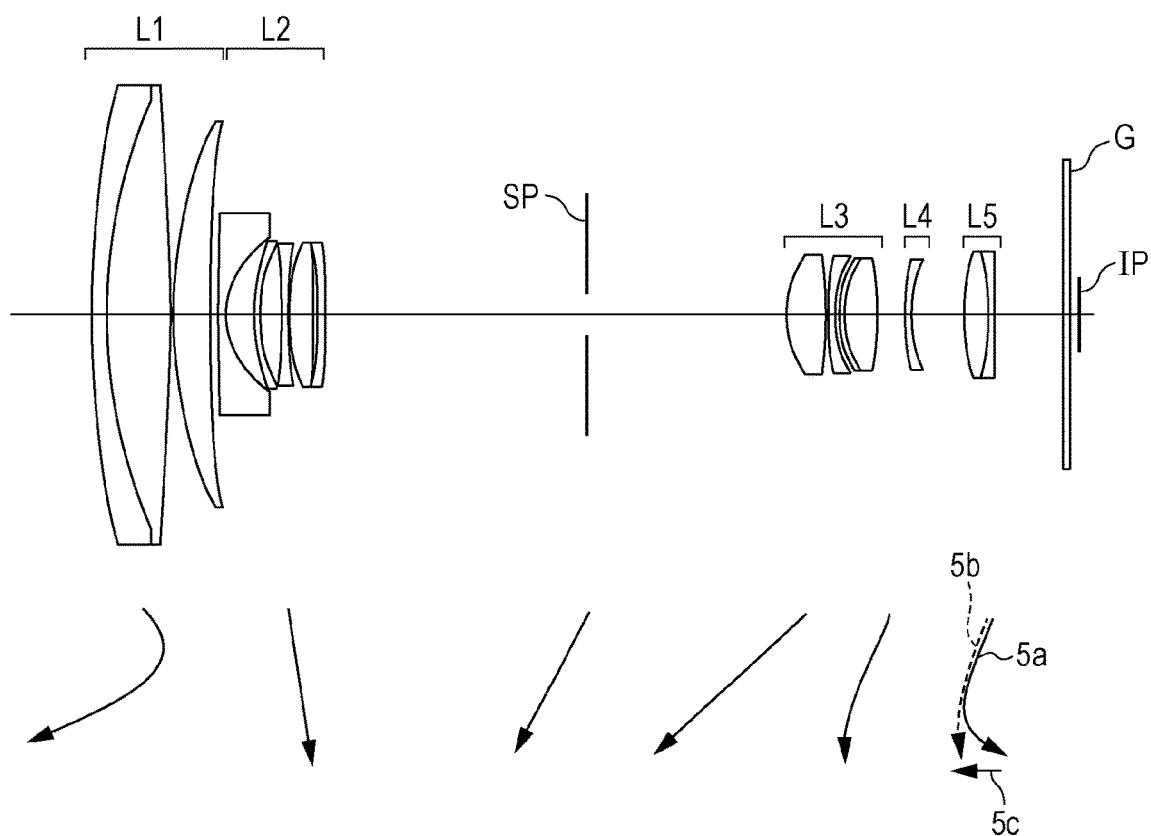
FIG. 5 is a cross-sectional view of a zoom lens at the wide-angle end according to a third embodiment.
Figure 7:
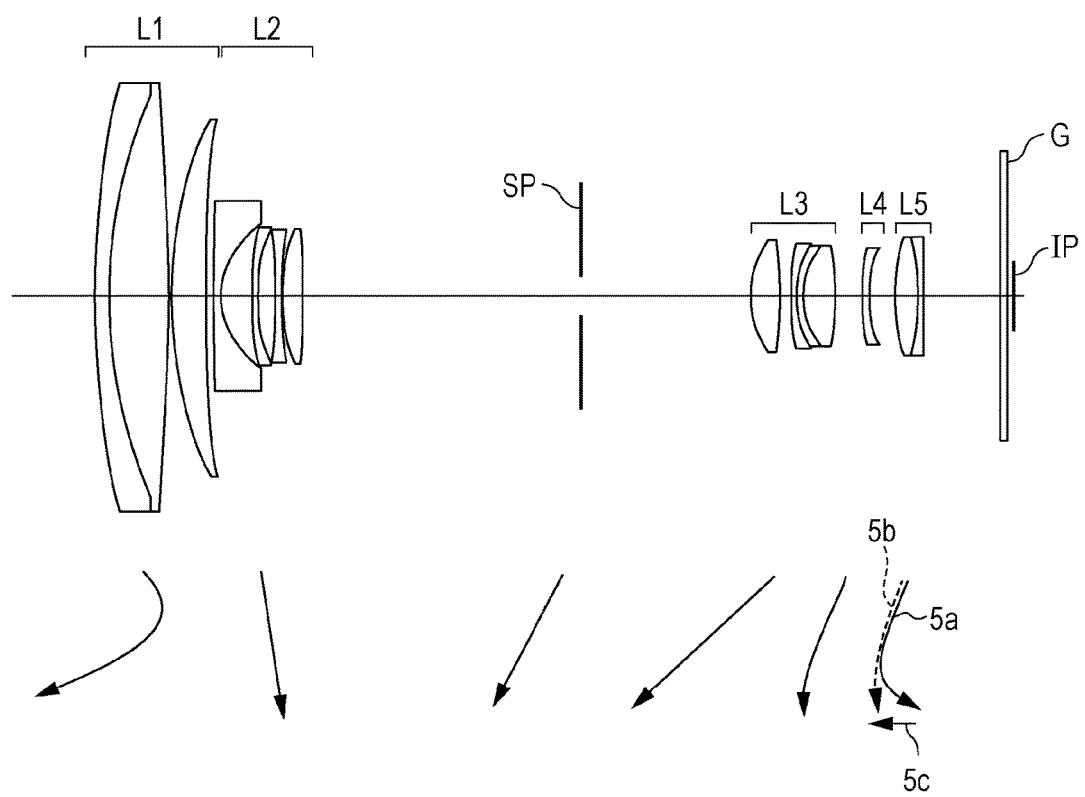
FIG. 7 is a cross-sectional view of a zoom lens at the wide-angle end according to a fourth embodiment.

FIG. 5 is a cross-sectional view of a zoom lens according to a third embodiment at the wide-angle end. FIGS. 6A, 6B, and 6C are aberration diagrams of the zoom lens of the third embodiment at the wide-angle end, the intermediate zooming point, and the telephoto end, respectively. The third embodiment is a zoom lens having a zoom ratio of 82.83 and an aperture ratio of about 3.50 to 8.00. FIG. 7 is a cross-sectional view of a zoom lens according to a fourth embodiment at the wide-angle end. FIGS. 8A, 8B, and 8C are aberration diagrams of the zoom lens of the fourth embodiment at the wide-angle end, the intermediate zooming point, and the telephoto end, respectively. The fourth embodiment is a zoom lens having a zoom ratio of 82.86 and an aperture ratio of about 3.50 to 8.00.

Figure 9:
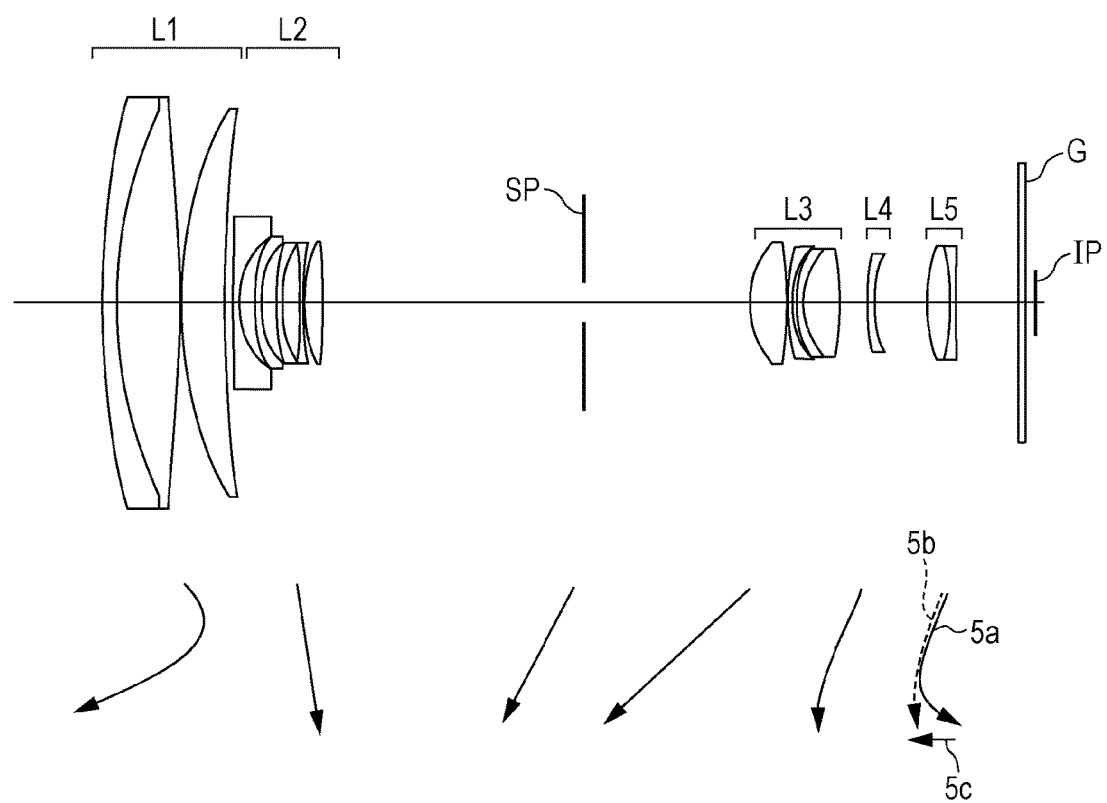
FIG. 9 is a cross-sectional view of a zoom lens at the wide-angle end according to a fifth embodiment.
Figure 10B:
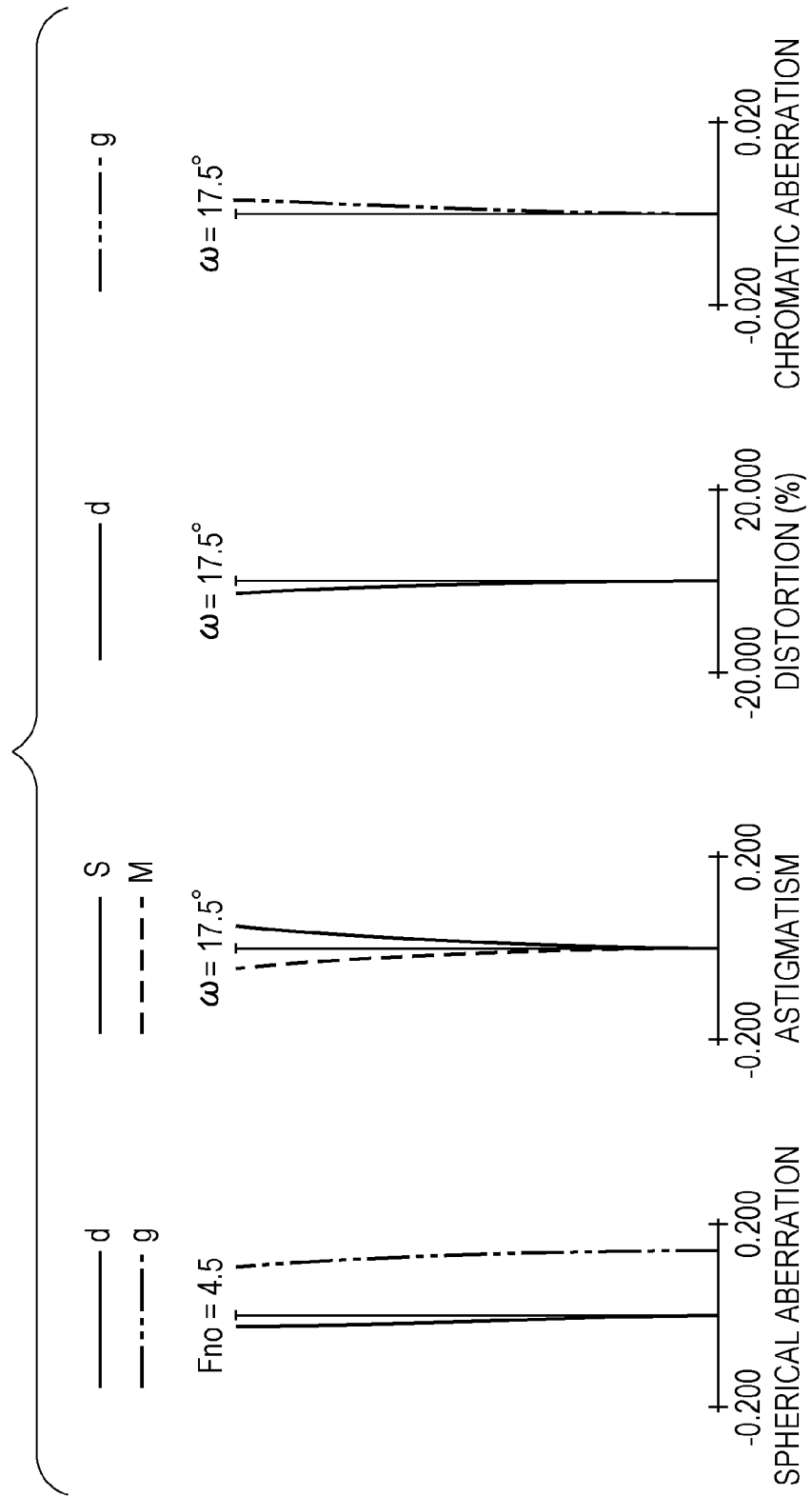
FIG. 10B is an aberration diagram of the zoom lens at the intermediate zooming position according to the fifth embodiment.
Figure 11:
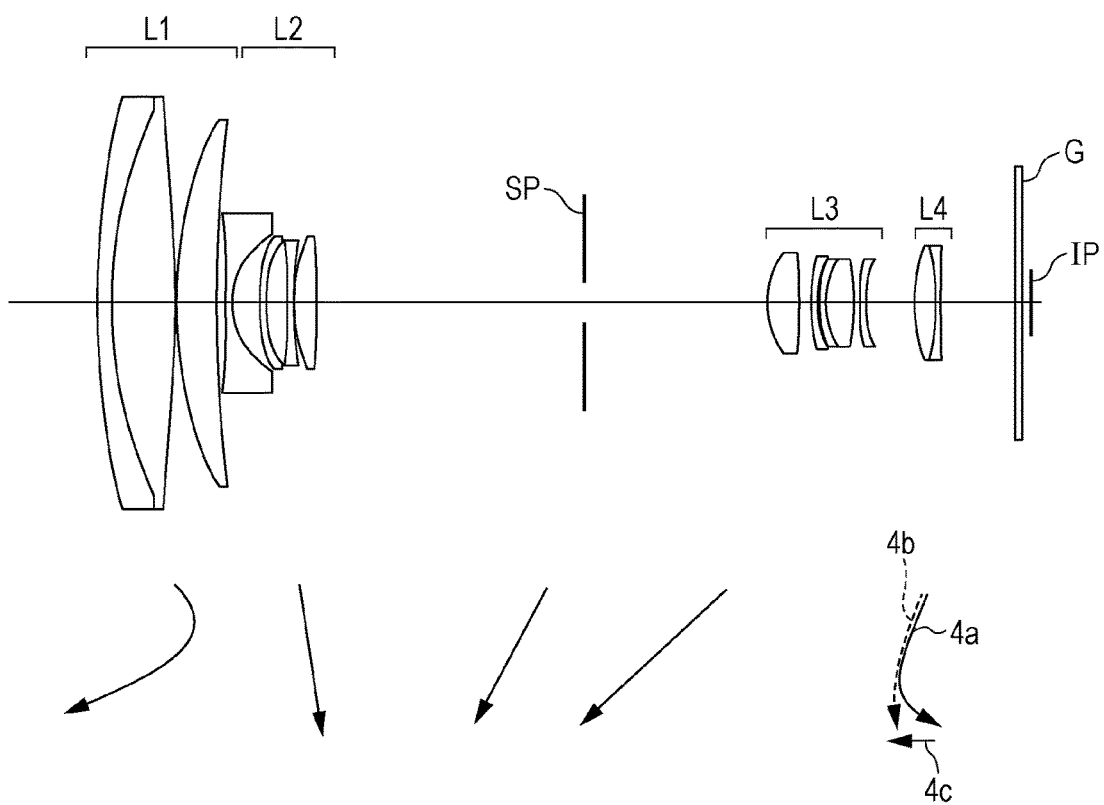
FIG. 11 is a cross-sectional view of a zoom lens at the wide-angle end according to a sixth embodiment.
Figure 12B:
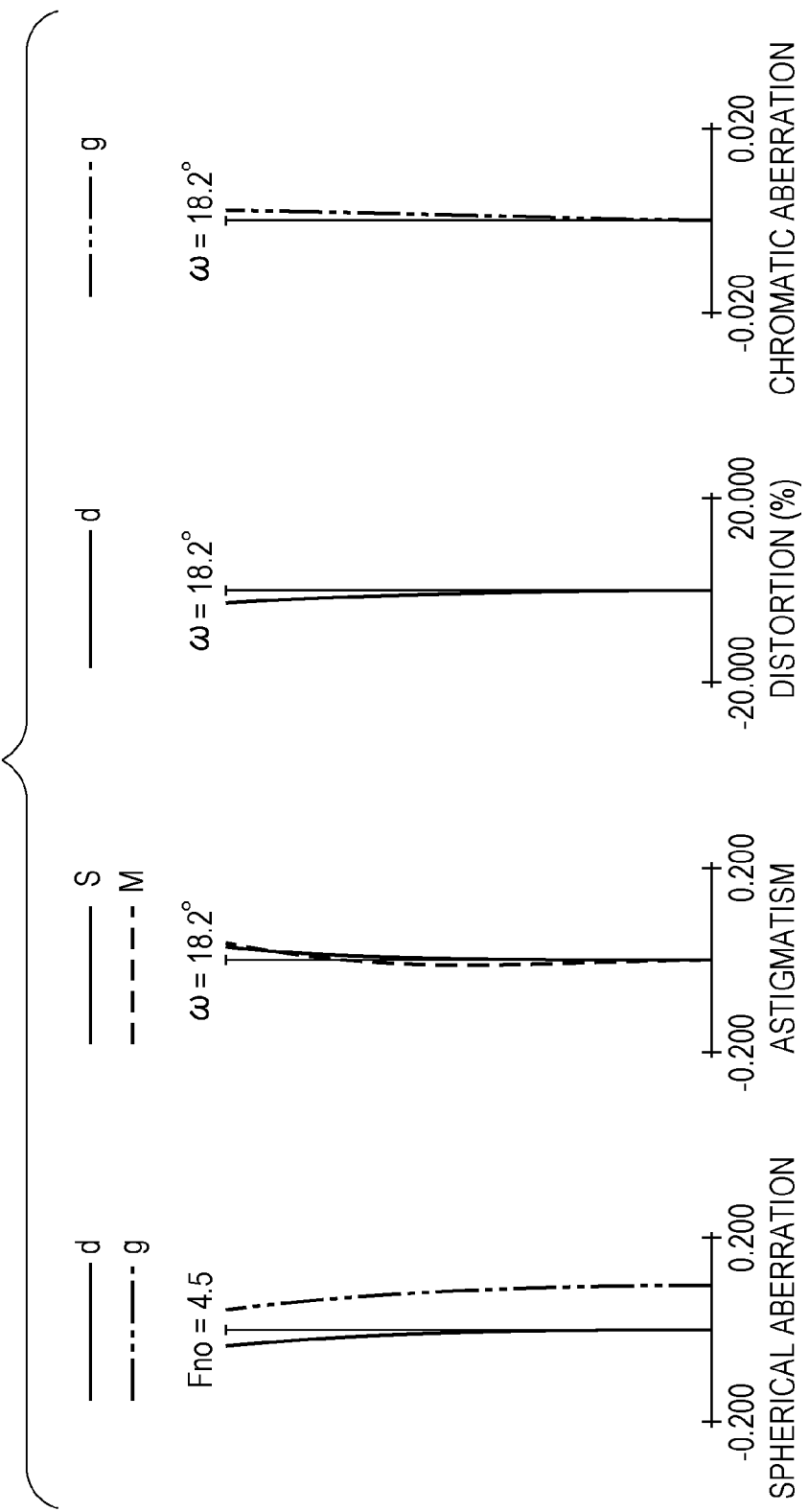
FIG. 12B is an aberration diagram of the zoom lens at the intermediate zooming position according to the sixth embodiment.

FIG. 9 is a cross-sectional view of a zoom lens according to a fifth embodiment at the wide-angle end. FIGS. 10A, 10B, and 10C are aberration diagrams of the zoom lens of the fifth embodiment at the wide-angle end, the intermediate zooming point, and the telephoto end, respectively. The fifth embodiment is a zoom lens having a zoom ratio of 101.45 and an aperture ratio of about 3.50 to 8.00. FIG. 11 is a cross-sectional view of a zoom lens according to a sixth embodiment at the wide-angle end. FIGS. 12A, 12B, and 12C are aberration diagrams of the zoom lens of the sixth embodiment at the wide-angle end, the intermediate zooming point, and the telephoto end, respectively. The sixth embodiment is a zoom lens having a zoom ratio of 82.99 and an aperture ratio of about 3.50 to 8.00.

Figure 13:
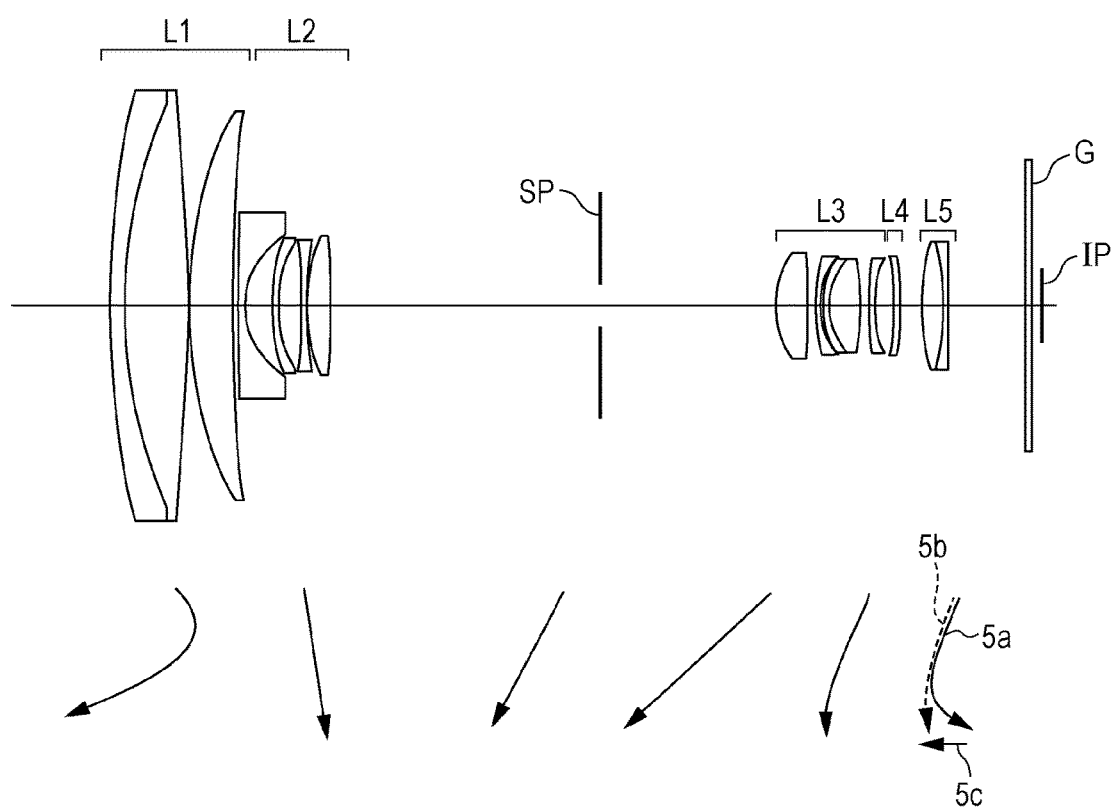
FIG. 13 is a cross-sectional view of a zoom lens at the wide-angle end according to a seventh embodiment.
Figure 14A:
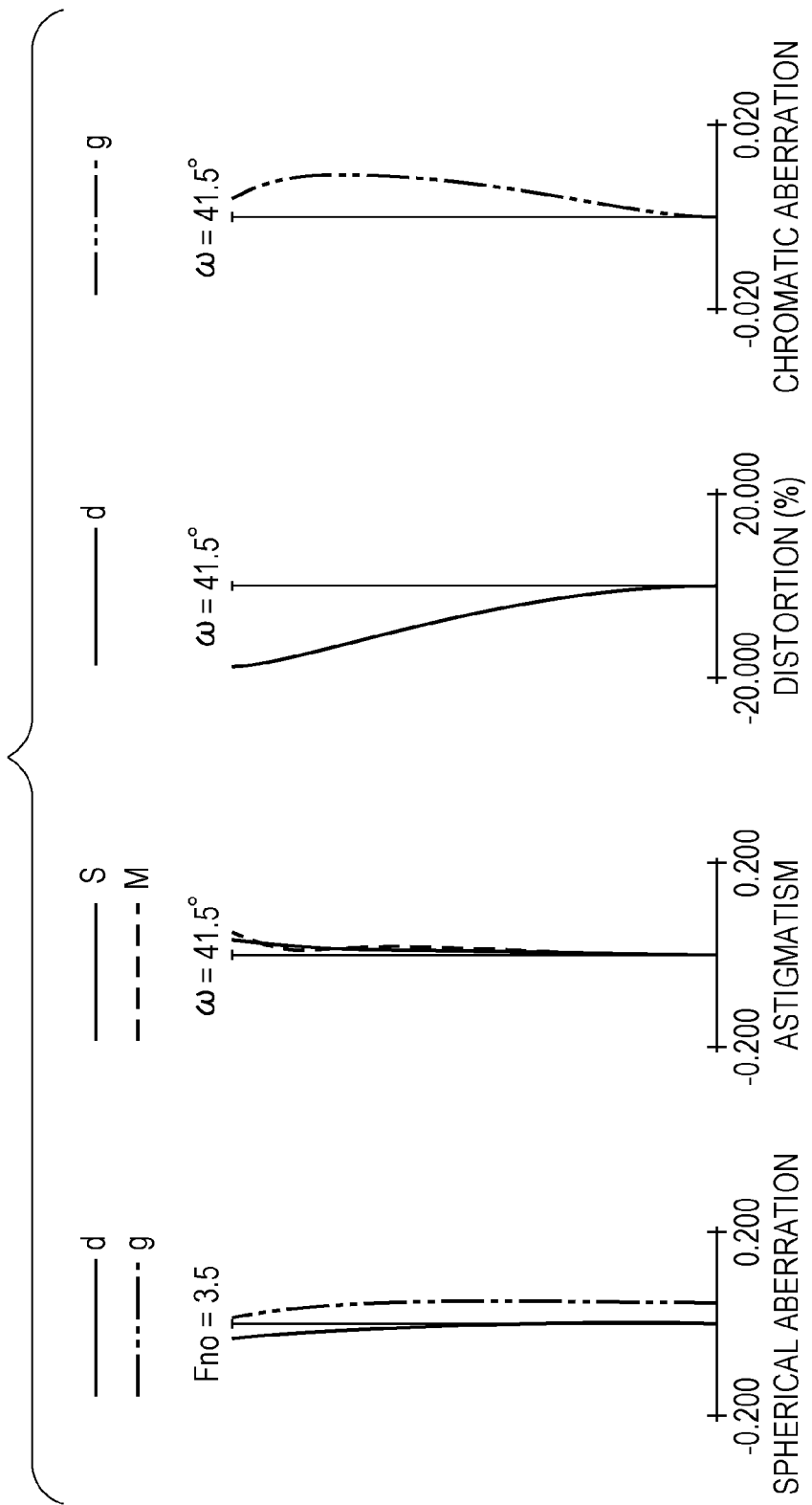
FIG. 14A is an aberration diagram of the zoom lens at the wide-angle end according to the seventh embodiment.
Figure 14C:
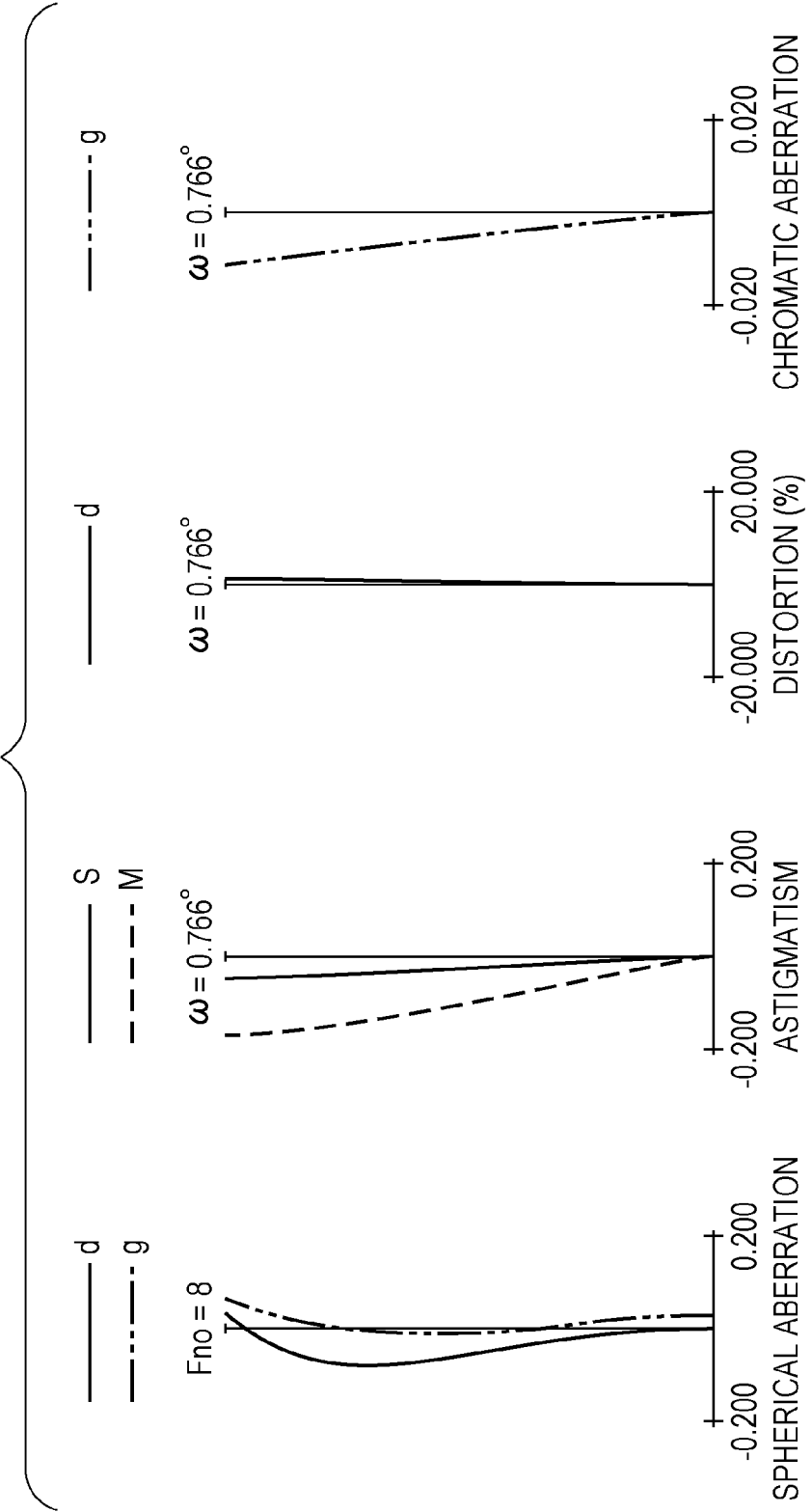
FIG. 14C is an aberration diagram of the zoom lens at the telephoto end according to the seventh embodiment.

FIG. 13 is a cross-sectional view of a zoom lens according to a seventh embodiment at the wide-angle end. FIGS. 14A, 14B, and 14C are aberration diagrams of the zoom lens of the seventh embodiment at the wide-angle end, the intermediate zooming point, and the telephoto end, respectively. The seventh embodiment is a zoom lens having a zoom ratio of 82.83 and an aperture ratio of about 3.50 to 8.00.

Figure 15:
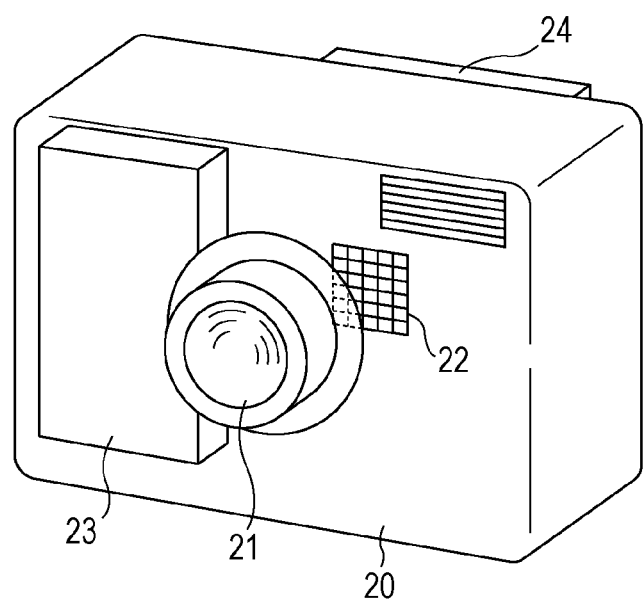
FIG. 15 is a schematic diagram of an exemplary image pickup apparatus according to an embodiment of the present invention.

FIG. 15 is a schematic diagram of a relevant part of a digital still camera (an image pickup apparatus) including a zoom lens of an embodiment of the present invention. Zoom lenses according to some embodiments are image-taking lenses for use in image pickup apparatuses, such as a video camera, a digital still camera, a silver-halide film camera, and a TV camera. In the cross-sectional views, the left side is the object side (front), and the right side is the image side (rear) of the zoom lenses. In the cross-sectional views, Li denotes an i-th lens unit, where i denotes the order of the lens unit from the object side to the image side.

The zoom lenses according to the first to fifth embodiments each consist of, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. The first to fifth embodiments are positive-lead type five-unit zoom lenses each consisting of five lens units, in which the rear lens group consists of the fourth lens unit L4 having negative refractive power and the fifth lens unit L5 having positive refractive power.

The zoom lens according to the sixth embodiment consists of, in order from the object side to the image side, a first lens unit L1 having positive refractive power, a second lens unit L2 having negative refractive power, a third lens unit L3 having positive refractive power, and a fourth lens unit L4 having positive refractive power. The sixth embodiment is a positive-lead type four-unit zoom lens consisting of four lens units, in which the rear lens group consists of the fourth lens unit L4 having positive refractive power.

The zoom lens according to the seventh embodiment consists of, in order from the object side to the image side, a first lens unit L1 having positive refractive power, a second lens unit L2 having negative refractive power, a third lens unit L3 having positive refractive power, a fourth lens unit L4 having positive refractive power, and a fifth lens unit L5 having positive refractive power. The seventh embodiment is a positive-lead type five-unit zoom lens consisting of five lens units, in which the rear lens group consists of the fourth lens unit L4 having positive refractive power and the fifth lens unit L5 having positive refractive power.

In the embodiments, reference sign SP denotes an aperture stop, which is disposed between the second lens unit L2 and the third lens unit L3.

Reference sign G denotes an optical block corresponding to an optical filter, a face plate, a low-pass filter, an infrared cut filter, or the like. Reference sign IP denotes an image plane. When the zoom lens is used as an image-pickup optical system of a video camera or a digital camera, the image plane IP corresponds to a solid-state image sensor (a photoelectric conversion element), such as a CCD sensor or a CMOS sensor. When the zoom lens is used as an image-pickup optical system of a silver-halide film camera, the image plane IP corresponds to a film surface.

In the spherical aberration diagrams, Fno denotes F-number, which indicates a spherical aberration for d-line (wavelength: 587.6 nm) and g-line (wavelength: 435.8 nm). In the astigmatism diagrams, S denotes a sagittal image plane and M denotes a meridional image plane. The distortion is for the d-line. The chromatic aberration diagrams show magnification chromatic aberrations for the g-line. Reference sign ω denotes a half angle of view for image capture. In the following embodiments, the wide-angle end and the telephoto end are zooming positions when lens units for varying magnification are located at both ends in a range in which the lens units can move on the optical axis under mechanical constraints.

In the embodiments, as indicated by arrows in the cross-sectional views, the lens units move during zooming from the wide-angle end toward the telephoto end to change the distance between adjacent lens units. At that time, the distance between the first lens unit L1 and the second lens unit L2 increases and the distance between the second lens unit L2 and the third lens unit L3 decreases at the telephoto end as compared with that at the wide-angle end.

Specifically, in the embodiments, the first lens unit L1 moves in a locus convex to the image side during zooming from the wide-angle end toward the telephoto end. The second lens unit L2 moves closer to the image side at the telephoto end than at the wide-angle end. The third lens unit L3 moves closer to the object side at the telephoto end than at the wide-angle end.

In the zoom lenses according to the first to fifth embodiments and the seventh embodiment, the fourth lens unit L4 moves closer to the object side with respect to the image plane at the telephoto end than at the wide-angle end. The fifth lens unit L5 moves in a locus convex to the object side during zooming from the wide-angle end to the telephoto end.

In the zoom lens according to the sixth embodiment, the fourth lens unit L4 moves in a locus convex to the object side during zooming from the wide-angle end to the telephoto end.

In the above embodiments, a lens unit closest to the image side is used as a focus lens unit. In the zoom lenses of the firsts to fifth embodiments and the seventh embodiment, the fifth lens unit L5 is used as a focus lens unit, and in the zoom lens of the sixth embodiment, the fourth lens unit L4 is used as a focus lens unit.

In the zoom lens of the first to fifth embodiments and the seventh embodiment, for focusing from an object at infinity to a nearby object at the telephoto end, the fifth lens unit L5 is moved toward the object side, as indicated by an arrow 5c in the cross sectional views. A solid line 5a and a dotted line 5b in the cross-sectional views show moving loci for correcting variations in image plane due to zooming from the wide-angle end toward the telephoto end during focusing to the object at infinity and the nearby object, respectively.

In the zoom lens of the sixth embodiment (FIG. 11), for focusing from an object at infinity to a nearby object at the telephoto end, the fourth lens unit L4 is moved towards the object side, as indicated by an arrow 4c in the cross-sectional view. A solid line 4a and a dotted line 4b in the cross-sectional view show moving loci for correcting variations in image plane due to zooming from the wide-angle end toward the telephoto end during focusing to the object at infinity and the nearby object, respectively.

In the embodiments, the proportion of the magnification changing operation of the second lens unit L2 is relatively high. This allows high magnification to be achieved without increasing the moving distance of the first lens unit L1 toward the object side at the telephoto end. Furthermore, by relatively increasing the refractive power of the second lens unit L2, a wide angle of view is achieved.

In the embodiments, the aperture stop SP is moved in a locus different from those of the lens units during zooming so that the distance between the aperture stop SP and the third lens unit L3 becomes smaller at the telephoto end than at the wide-angle end. Since this can move the entrance pupil position to the object side, the incident height of off-axis light passing through the first lens unit L1 and the second lens unit L2 can be decreased. Thus, the effective diameter of the front lens can be decreased.

In the embodiments, the following conditional equations are satisfied:

$$22.0 < f1/fW < 35.0 \tag{1}$$

$$20.0 < |fT/f2| < 50.0 \tag{2}$$

where fW is the focal length of the entire system (zoom lens) at the wide-angle end, fT is the focal length of the entire system at the telephoto end, f1 is the focal length of the first lens unit L1, and f2 is the focal length of the second lens unit L2.

If the focal length f1 of the first lens unit L1 increases beyond an upper limit of conditional equation (1), the refractive power of the first lens unit L1 decreases. Thus, in order to achieve high magnification, it is necessary to increase the amount of movement of the first lens unit L1 during zooming, thus disadvantageously increasing the overall length of the zoom lens at the telephoto end.

If the focal length f1 of the first lens unit L1 decreases beyond a lower limit of conditional equation (1), the refractive power of the first lens unit L1 increases. This disadvantageously makes it difficult to sufficiently correct spherical aberration at the telephoto end.

If the focal length f2 of the second lens unit L2 decreases beyond an upper limit of conditional equation (2), the refractive power of the second lens unit L2 increases. This disadvantageously makes it difficult to sufficiently correct the curvature of field at the wide-angle end and to sufficiently correct spherical aberration at the telephoto end.

If the focal length f2 of the second lens unit L2 increases beyond a lower limit of conditional equation (2), the refractive power of the second lens unit L2 decreases. Thus, in order to achieve high magnification, it is necessary to increase the amount of movement of the second lens unit L2 during zooming, thus disadvantageously increasing the overall lens length at the telephoto end.

In the above embodiments, the individual factors are appropriately set so as to satisfy conditional equations (1) and (2). Thus, a compact, high-magnification, wide-angle-of-view zoom lens having a good optical performance in all zoom ranges can be obtained.

In some embodiments, the numerical ranges of conditional equations (1) and (2) is preferably set as follows:

$$23.0 < f1/fW < 32.0 \tag{1a}$$

$$22.0 < |fT/f2| < 48.0 \tag{2a}$$

The numerical ranges of conditional equations (1) and (2) is more preferably set as follows:

$$23.5 < f1/fW < 29.0 \tag{1b}$$

$$23.5 < |fT/f2| < 45.0 \tag{2b}$$

In some embodiments, in addition to equations (1)-(2) or respective variations thereof described above, one or more of the following conditional equations (3)-(9) or respective variations thereof described below may be advantageously satisfied:

$$9.0 < |f1/f2| < 15.0 \tag{3}$$

$$10.0 < |M1/fW| < 30.0 \tag{4}$$

$$10.0 < fT/M2 < 40.0 \tag{5}$$

$$0.50 < f21/f2 < 2.00 \tag{6}$$

$$0.80 < SF21 < 1.20 \tag{7}$$

$$-6.0 < MS/fW < -2.0 \tag{8}$$

$$10.0 < fT/f3 < 25.0 \tag{9}$$

where f3 is the focal length of the third lens unit L3, M1 is the amount of movement in the optical axis of the first lens unit L1 during zooming from the wide-angle end to the telephoto end, M2 is the amount of movement in the optical axis of the second lens unit L2, MS is the amount of movement in the optical axis of the aperture stop SP, f21 is the focal length of a negative lens closest to the object side of the second lens unit L2, and SF21 is the shape factor of a negative lens closest to the object side of the second lens unit L2. The amount of movement is a difference between the positions on the optical axis of each lens unit at the wide-angle end and the telephoto end. Signs of the amounts of movement are negative when the lens units are located closer to the object side at the telephoto end than at the wide-angle end and are positive when the lens units are located closer to the image side. The shape factor SF21 is expressed as SF21=(R1+R2)/(R1−R2), where R1 is the radius of curvature of an object-side surface of a negative lens closest to the object side of the second lens unit L2, and R2 is the radius of curvature of an image-side lens surface.

If the focal length f1 of the first lens unit L1 increases beyond an upper limit of conditional equation (3), the refractive power of the first lens unit L1 decreases. Thus, in order to achieve high magnification, it is necessary to increase the amount of movement of the first lens unit L1 during zooming, thus disadvantageously increasing the overall lens length at the telephoto end.

If the focal length f1 of the first lens unit L1 decreases beyond a lower limit of conditional equation (3), the refractive power of the first lens unit L1 increases. This disadvantageously makes it difficult to sufficiently correct spherical aberration at the telephoto end.

If the amount of movement, M1, of the first lens unit L1 increases beyond an upper limit of conditional equation (4), the overall lens length at the telephoto end disadvantageously increases.

If the amount of movement, M1, of the first lens unit L1 decreases beyond a lower limit of conditional equation (4), the refractive power of the individual lens units needs to be increased to achieve high magnification. This disadvantageously makes it difficult to reduce changes in spherical aberration and coma aberration caused by zooming.

If the amount of movement, M2, of the second lens unit L2 decreases beyond an upper limit of conditional equation (5), the refractive power of the second lens unit L2 needs to be increased to achieve high magnification. This disadvantageously makes it difficult to reduce changes in field curvature.

If the amount of movement, M2, of the second lens unit L2 increases beyond a lower limit of conditional equation (5), the overall lens length at the telephoto end disadvantageously increases.

If the focal length f21 of a negative lens closest to the object side of the second lens unit L2 increases beyond an upper limit of conditional equation (6), the refractive power of the negative lens closest to the object side of the second lens unit L2 decreases. This disadvantageously makes it difficult to achieve a wide angle of view.

If the focal length f21 of the negative lens closest to the object side of the second lens unit L2 decreases beyond a lower limit of conditional equation (6), the refractive power of the negative lens closest to the object side of the second lens unit L2 increases. This disadvantageously makes it difficult to sufficiently correct distortion at the wide-angle end.

If the shape factor SF21 exceeds an upper limit of conditional equation (7), the shape of the negative lens closest to the object side of the second lens unit L2 becomes similar to a meniscus shape, and thus, the position of the entrance pupil moves to the image side. This disadvantageously increases the front lens diameter.

If the shape factor SF21 falls below a lower limit of conditional equation (7), the shape of the negative lens closest to the object side of the second lens unit L2 becomes similar to a biconcave shape, and thus, it is disadvantageously difficult to sufficiently correct distortion.

If the amount of movement, MS, of the aperture stop SP decreases beyond an upper limit of conditional equation (8), the distance between the aperture stop SP and the third lens unit L3 at the wide-angle end increases, thus disadvantageously increasing the effective diameter of the third lens unit L3.

If the amount of movement MS of the aperture stop SP increases beyond a lower limit of conditional equation (8), the distance between the aperture stop SP and the first lens unit L1 at the wide-angle end increases, thus disadvantageously increasing the effective diameter of the front lens.

If the focal length f3 of the third lens unit L3 decreases beyond an upper limit of conditional equation (9), the refractive power of the third lens unit L3 increases. This disadvantageously makes it difficult to sufficiently correct spherical aberration and coma aberration at the telephoto end.

If the focal length f3 of the third lens unit L3 increases beyond a lower limit of conditional equation (9), the refractive power of the third lens unit L3 decreases. Thus, in order to achieve high magnification, the amount of movement of the third lens unit L3 during zooming needs to be increased, thus disadvantageously increasing the overall lens length at the telephoto end.

If the numerical ranges of conditional equations (3) to (9) are set as follows, the effects of conditional equations (3) to (9) can be maximized.

$$9.5 < |f1/f2| < 13.5 \tag{3a}$$

$$12.0 < |M1/fW| < 25.0 \tag{4a}$$

$$12.0 < fT/M2 < 35.0 \tag{5a}$$

$$0.80 < f21/f2 < 1.70 \tag{6a}$$

$$0.90 < SF21 < 1.10 \tag{7a}$$

$$-5.0 < MS/fW < -2.5 \tag{8a}$$

$$11.0 < fT/f3 < 23.0 \tag{9a}$$

More preferably, the numerical ranges of conditional equations (3) to (9) may be set as follows:

$$9.8 < |f1/f2| < 12.7 \tag{3b}$$

$$14.0 < |M1/fW| < 20.0 \tag{4b}$$

$$12.5 < fT/M2 < 31.0 \tag{5b}$$

$$1.00 < f21/f2 < 1.60 \tag{6b}$$

$$0.95 < SF21 < 1.06 \tag{7b}$$

$$-4.5<MS/fW<-3.2 \quad (8b)$$

$$11.3<fT/f3<21.0 \quad (9b)$$

Next, the configurations of the individual lens units will be described. In some embodiments, the first lens unit L1 includes, in order from the object side to the image side, a cemented lens consisting of a negative lens and a positive lens, and a positive lens. The configuration of the first lens unit L1 allows the effective diameter of the first lens unit L1 to be decreased while reducing the occurrence of spherical aberration and axial chromatic aberration.

In the first, second, fourth, sixth, and seventh embodiments, the second lens unit L2 includes, in order from the object side to the image side, a negative lens, a negative lens, a negative lens, and a positive lens. In the third embodiment, the second lens unit L2 includes, in order from the object side to the image side, a negative lens, a negative lens, a negative lens, a positive lens, and a negative lens. In the fifth embodiment, the second lens unit L2 includes, in order from the object side to the image side, a negative lens, a negative lens, a negative lens, a negative lens, and a positive lens. The configuration in which three negative lenses are continuously disposed from the object side allows off-axis light to be gradually refracted, thus allowing the effective diameter of the front lens to be decreased.

In the first to fifth embodiments, the third lens unit L3 includes, in order from the object side to the image side, a positive lens, a negative lens, and a cemented lens consisting of a negative lens and a positive lens. In the sixth to seventh embodiments, the third lens unit L3 includes, in order from the object side to the image side, a positive lens, a negative lens, a cemented lens consisting of a negative lens and a positive lens, and a negative lens. The configuration in which a positive lens, a negative lens, and a cemented lens consisting of a negative lens and a positive lens are disposed in order from the object side to the image side is a configuration in which a lens is added to a triplet lens system, which is called a tessar-type lens system. The tessar-type lens configuration allows the Petzval sum to be easily adjusted.

In the first to fifth embodiments, the fourth lens unit L4 includes a negative lens. In the sixth embodiment, the fourth lens unit L4 includes a cemented lens consisting of a positive lens and a negative lens. In the seventh embodiment, the fourth lens unit L4 includes a positive lens.

In the first to fifth embodiments and the seventh embodiment, the fifth lens unit L5 consists of a cemented lens consisting of a positive lens and a negative lens.

Next, numerical examples 1 to 7 corresponding to the first to seventh embodiments of the present invention, respectively, will be described. In the numerical examples, reference sign i denotes the order of the optical surface counted from the object side, ri denotes the radius of curvature of an i-th optical surface (an i-th surface), di denotes the distance between the i-th surface and an i+1-th surface, and ndi and vdi denote the refractive index and Abbe number of the material of an i-th optical element for d-line, respectively.

An aspherical shape x, with a displacement along the optical axis from a surface vertex at a height h from the optical axis, is expressed as:

$$x=(h^2/R)/[1+[1-(1+k)(h/R)^2]^{1/2}]+A4h^4+A6h^6+A8h^8$$

where k is eccentricity, A4, A6, and A8 are aspherical coefficients, and R is the radius of paraxial curvature. The expression "e-Z" denotes "$10^{-Z}$". In the numerical examples, two surfaces closest to the image side are the surfaces of an optical block, such as a filter or a face plate.

In the numerical examples, back focus (BF) is a distance from the surface of the lens system closest to the image side to a paraxial image plane, expressed as a length in free space (air). Table 1 shows a summary of the conditional expressions described above as applied and satisfied in the various numerical examples given.

The diameter of an effective image circle (the diameter of an image circle) at the wide-angle end can be smaller than the diameter of an effective image circle at the telephoto end. This is because barrel distortion, which tends to occur at the wide angle end, can be corrected by expanding the image by image processing.

Numerical Example 1 in mm
Surface data

| Surface number | r | d | nd | vd |
|---|---|---|---|---|
| 1 | 99.088 | 1.45 | 1.91082 | 35.3 |
| 2 | 54.874 | 5.15 | 1.49700 | 81.5 |
| 3 | −211.867 | 0.05 | | |
| 4 | 46.621 | 3.50 | 1.49700 | 81.5 |
| 5 | 149.510 | (variable) | | |
| 6 | 582.612 | 0.75 | 1.88300 | 40.8 |
| 7 | 8.659 | 3.60 | | |
| 8* | 89.598 | 0.60 | 1.85135 | 40.1 |
| 9* | 22.291 | 2.07 | | |
| 10 | −48.321 | 0.60 | 2.00100 | 29.1 |
| 11 | 48.321 | 0.10 | | |
| 12 | 22.071 | 2.30 | 1.95906 | 17.5 |
| 13 | −83.220 | (variable) | | |
| 14 (aperture) | ∞ | (variable) | | |
| 15* | 9.687 | 2.65 | 1.55332 | 71.7 |
| 16* | −51.163 | 1.88 | | |
| 17 | 26.149 | 0.60 | 1.80400 | 46.6 |
| 18 | 10.189 | 0.41 | | |
| 19 | 14.465 | 0.60 | 2.00100 | 29.1 |
| 20 | 9.521 | 2.65 | 1.49700 | 81.5 |
| 21 | −32.633 | (variable) | | |
| 22 | 45.644 | 0.70 | 1.48749 | 70.2 |
| 23 | 16.453 | (variable) | | |
| 24 | 22.569 | 2.10 | 1.88300 | 40.8 |
| 25 | −26.062 | 0.50 | 2.00069 | 25.5 |
| 26 | 280.702 | (variable) | | |
| 27 | ∞ | 0.80 | 1.51633 | 64.1 |
| 28 | ∞ | 1.00 | | |
| Image plane | ∞ | | | |

Aspherical surface data

Eighth surface

K = 0.00000e+000 A4 = 7.20275e−005
A6 = −8.26748e−008 A8 = 5.62097e−009

Ninth surface

K = 0.00000e+000 A4 = 4.04869e−005
A6 = 4.36250e−007 A8 = −3.95438e−009

15th surface

K = −9.27507e−001 A4 = −2.01895e−005
A6 = 1.46446e−006 A8 = −2.74389e−008

16th surface

K = 0.00000e+000 A4 = −8.95624e−007
A6 = 1.40143e−006 A8 = −3.17865e−008

Data Zoom ratio 56.62

| | Wide angle end | Intermediate point | Telephoto end |
|---|---|---|---|
| Focal length | 3.71 | 10.68 | 210.00 |
| F-number | 3.50 | 4.50 | 7.07 |

-continued

| | | | |
|---|---|---|---|
| Half angle of view | 40.59 | 19.95 | 1.06 |
| Overall lens length | 95.63 | 87.34 | 148.16 |
| BF | 10.22 | 17.10 | 9.73 |
| d 5 | 0.75 | 5.98 | 69.14 |
| d13 | 29.71 | 6.82 | 1.19 |
| d14 | 16.60 | 10.12 | 0.36 |
| d21 | 2.85 | 3.90 | 10.94 |
| d23 | 2.98 | 10.88 | 24.29 |
| d26 | 8.69 | 15.58 | 8.20 |

Zoom-lens-unit data

| Unit | First surface | Focal length |
|---|---|---|
| 1 | 1 | 87.93 |
| 2 | 6 | −8.85 |
| 3 | 15 | 18.29 |
| 4 | 22 | −53.19 |
| 5 | 24 | 31.82 |

Numerical Example 2 in mm
Surface data

| Surface number | r | d | nd | vd |
|---|---|---|---|---|
| 1 | 100.692 | 1.45 | 1.91082 | 35.3 |
| 2 | 55.577 | 5.30 | 1.49700 | 81.5 |
| 3 | −217.605 | 0.05 | | |
| 4 | 46.818 | 3.45 | 1.49700 | 81.5 |
| 5 | 147.663 | (variable) | | |
| 6 | 463.546 | 0.75 | 1.88300 | 40.8 |
| 7 | 8.482 | 3.49 | | |
| 8* | 47.948 | 0.60 | 1.85135 | 40.1 |
| 9* | 18.028 | 2.19 | | |
| 10 | −49.954 | 0.60 | 2.00100 | 29.1 |
| 11 | 49.954 | 0.10 | | |
| 12 | 21.928 | 2.35 | 1.95906 | 17.5 |
| 13 | −89.446 | (variable) | | |
| 14 (aperture) | ∞ | (variable) | | |
| 15* | 10.089 | 2.90 | 1.55332 | 71.7 |
| 16* | −56.015 | 1.94 | | |
| 17 | 27.598 | 0.60 | 1.80400 | 46.6 |
| 18 | 10.711 | 0.20 | | |
| 19 | 12.467 | 0.60 | 2.00100 | 29.1 |
| 20 | 8.582 | 2.85 | 1.49700 | 81.5 |
| 21 | −37.456 | (variable) | | |
| 22 | 35.472 | 0.70 | 1.48749 | 70.2 |
| 23 | 13.821 | (variable) | | |
| 24 | 21.528 | 2.25 | 1.88300 | 40.8 |
| 25 | −24.684 | 0.50 | 2.00069 | 25.5 |
| 26 | 226.128 | (variable) | | |
| 27 | ∞ | 0.80 | 1.51633 | 64.1 |
| 28 | ∞ | 1.00 | | |
| Image plane | ∞ | | | |

Aspherical surface data

Eighth surface

K = 0.00000e+000 A4 = 8.71356e−005
A6 = −8.56245e−008 A8 = 1.73331e−008

Ninth surface

K = 0.00000e+000 A4 = 4.51546e−005
A6 = 1.12395e−007 A8 = 9.15402e−009

15th surface

K = −8.61609e−001 A4 = −2.43440e−005
A6 = 1.52411e−006 A8 = −4.22597e−008

16th surface

K = 0.00000e+000 A4 = −6.39177e−007
A6 = 1.55492e−006 A8 = −5.07735e−008

Data Zoom ratio 59.97

| | Wide angle end | Intermediate point | Telephoto end |
|---|---|---|---|
| Focal length | 3.50 | 11.43 | 210.00 |
| F-number | 3.50 | 4.50 | 7.07 |
| Half angle of view | 41.52 | 18.73 | 1.06 |
| Overall lens length | 96.99 | 88.85 | 150.49 |
| BF | 9.59 | 18.92 | 9.87 |
| d 5 | 0.75 | 6.28 | 70.57 |
| d13 | 30.82 | 5.49 | 1.19 |
| d14 | 7.02 | 9.51 | 0.35 |
| d21 | 2.85 | 2.66 | 10.62 |
| d23 | 2.81 | 12.85 | 24.73 |
| d26 | 8.07 | 17.39 | 8.35 |

Zoom-lens-unit data

| Unit | First surface | Focal length |
|---|---|---|
| 1 | 1 | 89.45 |
| 2 | 6 | −8.76 |
| 3 | 15 | 17.83 |
| 4 | 22 | −46.95 |
| 5 | 24 | 30.95 |

Numerical Example 3 in mm
Surface data

| Surface number | r | d | nd | vd |
|---|---|---|---|---|
| 1 | 100.576 | 1.45 | 1.83481 | 42.7 |
| 2 | 53.078 | 6.50 | 1.43875 | 94.9 |
| 3 | −196.899 | 0.05 | | |
| 4 | 46.003 | 4.00 | 1.43875 | 94.9 |
| 5 | 191.187 | (variable) | | |
| 6 | 400.145 | 0.75 | 1.88300 | 40.8 |
| 7 | 8.633 | 2.84 | | |
| 8* | 26.884 | 0.60 | 1.85135 | 40.1 |
| 9* | 17.086 | 2.27 | | |
| 10 | −45.837 | 0.60 | 2.00100 | 29.1 |
| 11 | 45.837 | 0.10 | | |
| 12 | 20.287 | 2.45 | 1.95906 | 17.5 |
| 13 | −72.089 | 0.32 | | |
| 14 | −38.223 | 0.50 | 1.88300 | 40.8 |
| 15 | −101.244 | (variable) | | |
| 16 (aperture) | ∞ | (variable) | | |
| 17* | 10.106 | 4.00 | 1.55332 | 71.7 |
| 18* | −37.380 | 0.17 | | |
| 19 | 27.733 | 0.60 | 1.80400 | 46.6 |
| 20 | 10.636 | 0.30 | | |
| 21 | 12.372 | 0.60 | 2.00100 | 29.1 |
| 22 | 9.073 | 3.45 | 1.49700 | 81.5 |
| 23 | −60.150 | (variable) | | |
| 24 | 28.193 | 0.70 | 1.48749 | 70.2 |
| 25 | 13.443 | (variable) | | |
| 26 | 21.778 | 2.45 | 1.88300 | 40.8 |
| 27 | −25.013 | 0.50 | 2.00069 | 25.5 |
| 28 | 134.662 | (variable) | | |
| 29 | ∞ | 0.80 | 1.51633 | 64.1 |
| 30 | ∞ | 1.00 | | |
| Image plane | ∞ | | | |

-continued

Aspherical surface data

Eighth surface

K = 0.00000e+000 A4 = 9.56498e−005
A6 = −1.09325e−006 A8 = 2.80584e−008

Ninth surface

K = 0.00000e+000 A4 = 7.34613e−005
A6 = −1.60912e−006 A8 = 3.01540e−008

17th surface

K = −9.98896e−001 A4 = 2.46537e−006
A6 = 1.08585e−006 A8 = 4.55958e−009

18th surface

K = 0.00000e+000 A4 = 2.92779e−005
A6 = 1.46765e−006 A8 = −4.15789e−009

Data Zoom ratio 82.83

| | Wide angle end | Intermediate point | Telephoto end |
|---|---|---|---|
| Focal length | 3.50 | 12.09 | 290.00 |
| F-number | 3.50 | 4.50 | 8.00 |
| Half angle of view | 41.52 | 17.77 | 0.77 |
| Overall lens length | 99.47 | 93.59 | 162.07 |
| BF | 8.28 | 15.44 | 5.48 |
| d 5 | 0.75 | 7.50 | 78.02 |
| d15 | 26.69 | 9.80 | 0.40 |
| d16 | 20.18 | 5.24 | 0.20 |
| d23 | 2.85 | 5.22 | 10.06 |
| d25 | 5.24 | 14.92 | 32.44 |
| d28 | 6.76 | 13.91 | 3.95 |

Zoom-lens-unit data

| Unit | First surface | Focal length |
|---|---|---|
| 1 | 1 | 96.74 |
| 2 | 6 | −8.44 |
| 3 | 17 | 17.30 |
| 4 | 24 | −53.54 |
| 5 | 26 | 34.35 |

Numerical Example 4 in mm
Surface data

| Surface number | r | d | nd | vd |
|---|---|---|---|---|
| 1 | 101.987 | 1.45 | 1.83481 | 42.7 |
| 2 | 53.718 | 6.50 | 1.43875 | 94.9 |
| 3 | −181.248 | 0.05 | | |
| 4 | 46.194 | 4.00 | 1.43875 | 94.9 |
| 5 | 188.260 | (variable) | | |
| 6 | −1025.728 | 0.75 | 1.88300 | 40.8 |
| 7 | 8.663 | 3.37 | | |
| 8* | 43.663 | 0.60 | 1.85135 | 40.1 |
| 9* | 18.529 | 2.05 | | |
| 10 | −48.583 | 0.60 | 2.00100 | 29.1 |
| 11 | 48.583 | 0.10 | | |
| 12 | 22.217 | 2.35 | 1.95906 | 17.5 |
| 13 | −86.221 | (variable) | | |
| 14 (aperture) | ∞ | (variable) | | |
| 15* | 10.201 | 3.10 | 1.55332 | 71.7 |
| 16* | −50.621 | 1.23 | | |
| 17 | 26.333 | 0.60 | 1.80400 | 46.6 |
| 18 | 10.745 | 0.28 | | |
| 19 | 12.455 | 0.60 | 2.00100 | 29.1 |
| 20 | 8.803 | 3.50 | 1.49700 | 81.5 |
| 21 | −42.505 | (variable) | | |
| 22 | 36.866 | 0.70 | 1.48749 | 70.2 |
| 23 | 12.924 | (variable) | | |
| 24 | 20.960 | 2.65 | 1.88300 | 40.8 |
| 25 | −23.939 | 0.50 | 2.00069 | 25.5 |
| 26 | 182.039 | (variable) | | |
| 27 | ∞ | 0.80 | 1.51633 | 64.1 |
| 28 | ∞ | 1.00 | | |
| Image plane | ∞ | | | |

Aspherical surface data

Eighth surface

K = 0.00000e+000 A4 = 7.03281e−005
A6 = −1.16931e−006 A8 = 2.72666e−008

Ninth surface

K = 0.00000e+000 A4 = 2.85558e−005
A6 = −1.41978e−007 A8 = 2.30781e−008

15th surface

K = −9.29056e−001 A4 = −9.11150e−006
A6 = 1.01972e−006 A8 = 5.95456e−010

16th surface

K = 0.00000e+000 A4 = 9.46308e−006
A6 = 1.26825e−006 A8 = −7.01837e−009

Data Zoom ratio 82.86

| | Wide angle end | Intermediate point | Telephoto end |
|---|---|---|---|
| Focal length | 3.50 | 11.90 | 290.00 |
| F-number | 3.50 | 4.50 | 8.00 |
| Half angle of view | 41.53 | 18.04 | 0.77 |
| Overall lens length | 99.52 | 93.33 | 160.98 |
| BF | 9.52 | 16.61 | 5.56 |
| d 5 | 0.75 | 7.09 | 77.10 |
| d13 | 30.05 | 8.72 | 0.40 |
| d14 | 18.30 | 7.01 | 0.10 |
| d21 | 2.85 | 4.84 | 10.52 |
| d23 | 2.78 | 13.78 | 32.03 |
| d26 | 7.99 | 15.08 | 4.04 |

Zoom-lens-unit data

| Unit | First surface | Focal length |
|---|---|---|
| 1 | 1 | 95.88 |
| 2 | 6 | −8.83 |
| 3 | 15 | 17.52 |
| 4 | 22 | −41.22 |
| 5 | 24 | 30.88 |

Numerical Example 5 in mm
Surface data

| Surface number | r | d | nd | vd |
|---|---|---|---|---|
| 1 | 101.121 | 1.45 | 1.83481 | 42.7 |
| 2 | 54.110 | 6.95 | 1.43875 | 94.9 |
| 3 | −196.564 | 0.05 | | |
| 4 | 46.649 | 4.90 | 1.43875 | 94.9 |
| 5 | 180.155 | (variable) | | |
| 6 | −605.164 | 0.75 | 1.88300 | 40.8 |
| 7 | 10.219 | 1.78 | | |
| 8* | 63.545 | 0.60 | 1.85135 | 40.1 |
| 9* | 17.813 | 1.76 | | |
| 10 | 32.230 | 0.60 | 1.77250 | 49.6 |
| 11 | 16.287 | 1.79 | | |
| 12 | −69.142 | 0.30 | 2.00100 | 29.1 |
| 13 | 43.567 | 0.10 | | |
| 14 | 18.759 | 2.10 | 1.95906 | 17.5 |

-continued

| | | | | |
|---|---|---|---|---|
| 15 | −194.297 | (variable) | | |
| 16 (aperture) | ∞ | (variable) | | |
| 17* | 10.237 | 3.85 | 1.55332 | 71.7 |
| 18* | −44.683 | 0.23 | | |
| 19 | 26.181 | 0.60 | 1.80400 | 46.6 |
| 20 | 11.064 | 0.33 | | |
| 21 | 12.699 | 0.60 | 2.00100 | 29.1 |
| 22 | 8.945 | 4.20 | 1.49700 | 81.5 |
| 23 | −40.315 | (variable) | | |
| 24 | 32.816 | 0.70 | 1.48749 | 70.2 |
| 25 | 12.338 | (variable) | | |
| 26 | 20.674 | 2.50 | 1.88300 | 40.8 |
| 27 | −23.568 | 0.50 | 2.00069 | 25.5 |
| 28 | 145.228 | (variable) | | |
| 29 | ∞ | 0.80 | 1.51633 | 64.1 |
| 30 | ∞ | 1.00 | | |
| Image plane | ∞ | | | |

Aspherical surface data

Eighth surface

K = 0.00000e+000 A4 = 2.02182e−004
A6 = 2.53327e−006 A8 = −2.62556e−010

Ninth surface

K = 0.00000e+000 A4 = 2.41630e−004
A6 = 1.89978e−006 A8 = 5.12985e−008

17th surface

K = −8.74830e−001 A4 = −1.17633e−005
A6 = 1.36705e−006 A8 = −2.63087e−009

18th surface

K = 0.00000e+000 A4 = 2.51294e−005
A6 = 1.75696e−006 A8 = −1.25070e−008

Data Zoom ratio 101.45

| | Wide angle end | Intermediate point | Telephoto end |
|---|---|---|---|
| Focal length | 3.45 | 12.27 | 350.00 |
| F-number | 3.50 | 4.50 | 8.00 |
| Half angle of view | 41.94 | 17.53 | 0.63 |
| Overall lens length | 100.53 | 95.93 | 168.15 |
| BF | 8.25 | 17.71 | 3.77 |
| d 5 | 0.75 | 7.67 | 79.95 |
| d15 | 27.97 | 7.88 | 1.44 |
| d16 | 17.97 | 6.01 | 0.10 |
| d23 | 2.77 | 6.24 | 8.98 |
| d25 | 5.89 | 13.48 | 36.98 |
| d28 | 6.72 | 16.19 | 2.24 |

Zoom-lens-unit data

| Unit | First surface | Focal length |
|---|---|---|
| 1 | 1 | 98.12 |
| 2 | 6 | −7.80 |
| 3 | 17 | 16.96 |
| 4 | 24 | −41.02 |
| 5 | 26 | 31.68 |

Numerical Example 6 in mm
Surface data

| Surface number | r | d | nd | vd |
|---|---|---|---|---|
| 1 | 102.159 | 1.45 | 1.83481 | 42.7 |
| 2 | 53.829 | 6.80 | 1.43875 | 94.9 |
| 3 | −185.113 | 0.05 | | |
| 4 | 46.447 | 4.65 | 1.43875 | 94.9 |
| 5 | 182.260 | (variable) | | |
| 6 | −539.006 | 0.75 | 1.88300 | 40.8 |
| 7 | 8.496 | 3.21 | | |
| 8* | 41.656 | 0.60 | 1.85135 | 40.1 |
| 9* | 18.769 | 2.33 | | |
| 10 | −46.872 | 0.60 | 2.00100 | 29.1 |
| 11 | 46.872 | 0.10 | | |
| 12 | 21.507 | 2.50 | 1.95906 | 17.5 |
| 13 | −83.989 | (variable) | | |
| 14 (aperture) | ∞ | (variable) | | |
| 15* | 10.068 | 3.60 | 1.55332 | 71.7 |
| 16* | −47.055 | 1.09 | | |
| 17 | 24.823 | 0.60 | 1.80400 | 46.6 |
| 18 | 11.007 | 0.25 | | |
| 19 | 12.827 | 0.60 | 2.00100 | 29.1 |
| 20 | 8.694 | 3.25 | 1.49700 | 81.5 |
| 21 | −33.176 | 0.66 | | |
| 22 | 35.805 | 0.70 | 1.48749 | 70.2 |
| 23 | 13.171 | (variable) | | |
| 24 | 25.959 | 2.25 | 1.88300 | 40.8 |
| 25 | −30.690 | 0.50 | 2.00069 | 25.5 |
| 26 | 249.251 | (variable) | | |
| 27 | ∞ | 0.80 | 1.51633 | 64.1 |
| 28 | ∞ | 1.00 | | |
| Image plane | ∞ | | | |

Aspherical surface data

Eighth surface

K = 0.00000e+000 A4 = 1.38992e−004
A6 = −2.45174e−006 A8 = 6.04259e−008

Ninth surface

K = 0.00000e+000 A4 = 9.55537e−005
A6 = −2.48598e−007 A8 = 5.31277e−009

15th surface

K = −9.06973e−001 A4 = −1.27074e−005
A6 = 1.89998e−006 A8 = −5.60601e−009

16th surface

K = 0.00000e+000 A4 = 2.77052e−005
A6 = 2.31537e−006 A8 = −1.67388e−008

Data Zoom ratio 82.99

| | Wide angle end | Intermediate point | Telephoto end |
|---|---|---|---|
| Focal length | 3.49 | 11.78 | 290.00 |
| F-number | 3.50 | 4.50 | 8.00 |
| Half angle of view | 41.58 | 18.21 | 0.77 |
| Overall lens length | 100.88 | 94.85 | 162.90 |
| BF | 9.50 | 15.45 | 4.37 |
| d 5 | 0.75 | 7.42 | 78.69 |
| d13 | 28.81 | 6.13 | 0.40 |
| d14 | 19.72 | 10.03 | 0.09 |
| d23 | 5.29 | 19.00 | 42.53 |
| d26 | 7.97 | 13.92 | 2.84 |

Zoom-lens-unit data

| Unit | First surface | Focal length |
|---|---|---|
| 1 | 1 | 97.39 |
| 2 | 6 | −8.87 |
| 3 | 15 | 20.53 |
| 5 | 24 | 37.71 |

Numerical Example 7

Surface data (in mm)

| Surface number | r | d | nd | vd |
|---|---|---|---|---|
| 1 | 101.545 | 1.45 | 1.83481 | 42.7 |
| 2 | 53.860 | 6.80 | 1.43875 | 94.9 |
| 3 | −186.630 | 0.05 | | |
| 4 | 46.469 | 4.70 | 1.43875 | 94.9 |
| 5 | 178.951 | (variable) | | |
| 6 | −469.844 | 0.75 | 1.88300 | 40.8 |
| 7 | 8.554 | 3.07 | | |
| 8* | 42.475 | 0.60 | 1.85135 | 40.1 |
| 9* | 18.671 | 2.39 | | |
| 10 | 47.363 | 0.60 | 2.00100 | 29.1 |
| 11 | 47.363 | 0.10 | | |
| 12 | 21.389 | 2.45 | 1.95906 | 17.5 |
| 13 | −88.041 | (variable) | | |
| 14 (aperture) | ∞ | (variable) | | |
| 15* | 10.074 | 3.45 | 1.55332 | 71.7 |
| 16* | −48.040 | 0.98 | | |
| 17 | 24.862 | 0.60 | 1.80400 | 46.6 |
| 18 | 11.069 | 0.25 | | |
| 19 | 12.920 | 0.60 | 2.00100 | 29.1 |
| 20 | 8.752 | 3.15 | 1.49700 | 81.5 |
| 21 | −34.632 | 0.91 | | |
| 22 | 35.796 | 0.70 | 1.48749 | 70.2 |
| 23 | 12.977 | (variable) | | |
| 24 | −48.772 | 0.70 | 1.48749 | 70.2 |
| 25 | −40.727 | (variable) | | |
| 26 | 25.499 | 2.35 | 1.88300 | 40.8 |
| 27 | −30.049 | 0.50 | 2.00069 | 25.5 |
| 28 | 202.607 | (variable) | | |
| 29 | ∞ | 0.80 | 1.51633 | 64.1 |
| 30 | ∞ | 1.00 | | |
| Image plane | ∞ | | | |

Aspherical surface data

Eighth surface

K = 0.00000e+000 A4 = 1.37422e−004
A6 = −1.12109e−006 A8 = 4.65859e−008

Ninth surface

K = 0.00000e+000 A4 = 9.67729e−005
A6 = −1.08822e−006 A8 = 3.94474e−009

15th surface

K = −8.77722e−001 A4 = −2.49141e−005
A6 = 2.10241e−006 A8 = −2.55576e−008

16th surface

K = 0.00000e+000 A4 = 1.52925e−005
A6 = 2.41404e−006 A8 = −3.80960e−008

Data Zoom ratio 82.83

| | Wide angle end | Intermediate point | Telephoto end |
|---|---|---|---|
| Focal length | 3.50 | 11.91 | 290.00 |
| F-number | 3.50 | 4.50 | 8.00 |
| Half angle of view | 41.52 | 18.02 | 0.77 |
| Overall lens length | 100.17 | 94.47 | 162.95 |
| BF | 9.89 | 16.89 | 3.96 |
| d 5 | 0.75 | 7.84 | 78.76 |
| d13 | 28.87 | 5.33 | 0.40 |
| d14 | 18.97 | 10.01 | 0.10 |
| d23 | 2.00 | 6.38 | 3.82 |
| d25 | 2.27 | 10.60 | 38.50 |
| d28 | 8.36 | 15.36 | 2.43 |

Zoom-lens-unit data

| Unit | First surface | Focal length |
|---|---|---|
| 1 | 1 | 97.51 |
| 2 | 6 | −8.88 |
| 3 | 15 | 20.88 |
| 4 | 24 | 492.43 |
| 5 | 26 | 38.81 |

TABLE 1

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| f1/fw | 23.71 | 25.55 | 27.63 | 27.40 | 28.44 | 27.87 | 27.85 |
| |fT/f2| | 23.72 | 23.98 | 34.36 | 32.84 | 44.87 | 32.68 | 32.68 |
| |f1/f2| | 9.93 | 10.21 | 11.46 | 10.86 | 12.58 | 10.98 | 10.99 |
| |M1/fw| | 14.16 | 15.28 | 17.88 | 17.56 | 19.60 | 17.75 | 17.93 |
| fT/M2 | 13.24 | 12.86 | 19.77 | 19.48 | 30.21 | 18.21 | 19.05 |
| f21/f2 | 1.13 | 1.12 | 1.18 | 1.10 | 1.46 | 1.07 | 1.07 |
| SF21 | 1.03 | 1.04 | 1.04 | 0.98 | 0.97 | 0.97 | 0.96 |
| MS/fw | −3.41 | −3.80 | −3.32 | −4.22 | −4.33 | −3.57 | −3.78 |
| fT/f3 | 11.48 | 11.78 | 16.76 | 16.55 | 20.64 | 14.12 | 13.89 |

Next, an example of a digital still camera that uses a zoom lens of any of the embodiments of the present invention as an image-pickup optical system will now be described with reference to FIG. 15. In FIG. 15, reference sign 20 denotes a camera body; 21 denotes an image-pickup optical system, which is implemented by any one of the zoom lenses described in Numerical examples 1 to 7; 22 denotes a solid-state image sensor (photoelectric conversion element), such as a CCD sensor or a CMOS sensor, which is housed in the camera body 20 and receives an image of a scene (subject) formed by the image-pickup optical system 21; 23 denotes a memory that stores image information corresponding to the image photoelectrically converted by the solid-state image sensor 22; and 24 denotes a viewfinder, for example, a liquid-crystal display panel, for observing the image formed on the solid-state image sensor 22. Application of the zoom lens of the present invention to an image sensor of a digital still camera allows a compact, high-magnification, wide-angle-of-view image pickup apparatus having high optical performance in all zoom ranges to be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-238317 filed Nov. 18, 2013, which is hereby incorporated by reference herein in its entirety.

What is claimed is:

1. A zoom lens comprising in order from an object side to an image side:
   a first lens unit having positive refractive power;
   a second lens unit having negative refractive power;
   a third lens unit having positive refractive power; and
   a rear lens group including one or more lens units,
   wherein a distance between adjacent lens units changes during zooming;
   the first lens unit is closer to the object side at a telephoto end than at the wide-angle end;
   the second lens unit includes three negative lenses which are continuously arranged from the object side to the image side; and
   following conditions are satisfied:

$22.0 < f1/fW < 35.0$ $20.0 < |fT/f2| < 50.0$ where fW is a focal length of the zoom lens at the wide-angle end, fT is a focal length of the zoom lens at the telephoto end, f1 is a focal length of the first lens unit, and f2 is a focal length of the second lens unit.

2. The zoom lens according to claim 1, wherein a following condition is satisfied:

$9.0 < |f1/f2| < 15.0$.

3. The zoom lens according to claim 1, wherein a following condition is satisfied:

$10.0 < |M1/fW| < 30.0$ where M1 is an amount of movement on an optical axis of the first lens unit during zooming from the wide-angle end to the telephoto end.

4. The zoom lens according to claim 1, wherein a following condition is satisfied, $10.0 < fT/M2 < 40.0$ where M2 is an amount of movement on an optical axis of the second lens unit during zooming from the wide-angle end to the telephoto end.

5. The zoom lens according to claim 1, wherein a following condition is satisfied:

$0.50 < f21/f2 < 2.00$ where f21 is a focal length of the first negative lens of the second lens unit.

6. The zoom lens according to claim 1, wherein a following condition is satisfied;

$0.80 < (R1+R2)/(R1-R2) < 1.20$ where R1 is a radius of curvature of an object-side lens surface of the first negative lens of the second lens unit, and R2 is a radius of curvature of an image-side lens surface of the first negative lens of the second lens unit.

7. The zoom lens according to claim 1, further comprising:
   an aperture stop between the second lens unit and the third lens unit, wherein a following condition is satisfied:

$-6.0 < MS/fW < -2.0$ where MS is an amount of movement on an optical axis of the aperture stop during zooming from the wide-angle end to the telephoto end.

8. The zoom lens according to claim 1, wherein a following condition is satisfied:

$10.0 < fT/f3 < 25.0$ where f3 is a focal length of the third lens unit.

9. The zoom lens according to claim 1, wherein focusing from an object at infinity to a nearby object is performed by moving a lens unit of the rear lens group in a direction towards the object side.

10. The zoom lens according to claim 1, wherein the rear lens group consists of a fourth lens unit having positive refractive power and disposed closest to the image side.

11. The zoom lens according to claim 10, wherein focusing from an object at infinity to a nearby object is performed by moving the fourth lens unit in a direction towards the object side.

12. The zoom lens according to claim 1, wherein the rear lens group consists of a fourth lens unit having negative refractive power and a fifth lens unit having positive refractive power.

13. The zoom lens according to claim 12, wherein focusing from an object at infinity to a nearby object is performed by moving the fifth lens unit in a direction towards the object side.

14. The zoom lens according to claim 1, wherein the rear lens group consists of a fourth lens unit having positive refractive power and a fifth lens unit having positive refractive power.

15. The zoom lens according to claim 14, wherein focusing from an object at infinity to a nearby object is performed by moving the fifth lens unit in a direction towards the object side.

16. An image pickup apparatus comprising:
   a zoom lens; and
   an image sensor configured to receive an image formed by the zoom lens,
   wherein the zoom lens comprises, in order from an object side to an image side:
      a first lens unit having positive refractive power;
      a second lens unit having negative refractive power;
      a third lens unit having positive refractive power; and
      a rear lens group including one or more lens units,
      wherein a distance between adjacent lens units changes during zooming;
      the first lens unit is closer to the object side at a telephoto end than at the wide-angle end;
      the second lens unit includes a first negative lens, a second negative lens, and a third negative lens in this order from the object side to the image side; and
      following conditions are satisfied:

$22.0 < f1/fW < 35.0$ $20.0 < |fT/f2| < 50.0$ where fW is a focal length of the zoom lens at the wide-angle end, fT is a focal length of the zoom lens at the telephoto end, f1 is a focal length of the first lens unit, and f2 is a focal length of the second lens unit.

* * * * *